(12) United States Patent
Nanda et al.

(10) Patent No.: US 8,676,125 B2
(45) Date of Patent: Mar. 18, 2014

(54) SYSTEMS AND METHODS OF REDUCING INTERFERENCE

(75) Inventors: Sanjiv Nanda, Ramona, CA (US);
Mehmet Yavuz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 264 days.

(21) Appl. No.: 12/611,743

(22) Filed: Nov. 3, 2009

(65) Prior Publication Data
US 2010/0120367 A1 May 13, 2010

Related U.S. Application Data

(60) Provisional application No. 61/112,510, filed on Nov. 7, 2008.

(51) Int. Cl.
*H04B 1/00* (2006.01)
*H04B 15/00* (2006.01)

(52) U.S. Cl.
USPC ........................................ 455/63.1; 455/63.4

(58) Field of Classification Search
USPC ........ 455/63.1, 63.4, 67.11, 67.13, 67.14, 69, 455/574, 114.2, 115.1–115.4, 127.1, 127.5, 455/226.1–226.4, 456.1
See application file for complete search history.

(56) References Cited

U.S. PATENT DOCUMENTS

| | | | |
|---|---|---|---|
| 6,456,652 B1 * | 9/2002 | Kim et al. | 375/224 |
| 6,597,926 B1 * | 7/2003 | Rek | 455/562.1 |
| 6,940,835 B2 * | 9/2005 | Reza et al. | 370/331 |
| 7,280,073 B2 * | 10/2007 | Sayers | 342/432 |
| 7,454,222 B2 * | 11/2008 | Huang et al. | 455/522 |
| 2007/0105574 A1 | 5/2007 | Gupta et al. | |
| 2007/0140168 A1 | 6/2007 | Laroia et al. | |
| 2008/0031221 A1 | 2/2008 | Nanda et al. | |
| 2008/0031223 A1 | 2/2008 | Nanda et al. | |

FOREIGN PATENT DOCUMENTS

| | | |
|---|---|---|
| WO | WO2005101888 | 10/2005 |
| WO | WO2007024895 | 3/2007 |
| WO | WO2007092896 | 8/2007 |

OTHER PUBLICATIONS

International Search Report and Written Opinion—PCT/US2009/063764, International Search Authority—European Patent Office—Dec. 10, 2010.
Taiwan Search Report—TW098137847—TIPO—Jul. 15, 2013.

* cited by examiner

*Primary Examiner* — Eugene Yun

(57) ABSTRACT

A system and method of reducing interference on a communication channel between an access terminal and a serving cell or node are disclosed. A cooperation request may be sent to an interfering cell or node to reduce and/or mitigate interference on the communication channel caused by the interfering cell or node. The interfering cell or node may perform beamforming, may intermittently transmit its wireless signal, or may move at least one antenna to mitigate and/or reduce interference on the communication channel.

44 Claims, 15 Drawing Sheets

SYSTEMS AND METHODS OF REDUCING INTERFERENCE

CLAIM OF PRIORITY UNDER 35 U.S.C. §119

The present application for patent claims priority to U.S. Provisional Application No. 61/112,510 entitled "MESSAGE EXCHANGE SEQUENCE TO ENABLE COOPERATION AMONG NEIGHBORING ACCESS POINT BASE STATIONS REUSING THE SAME FREQUENCY" filed Nov. 7, 2008, and assigned to the assignee hereof and hereby expressly incorporated by reference herein.

BACKGROUND

1. Field

The present application relates generally to wireless communication, and more specifically to systems and methods of reducing interference in wireless communication.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem. Multiple femto nodes may be deployed by individual users in the coverage area of a traditional macro node. Multiple femto nodes may be deployed by individual users in the coverage area of a traditional macro node. The coverage areas of the multiple femto nodes may overlap. Due to the overlapping coverage areas of the femto nodes, mobile phones may experience interference in the communication links with certain femto nodes. Reducing the interference caused by the overlapping coverage areas of femto nodes is desirable.

SUMMARY

In one embodiment, a wireless communication apparatus operable in a communication system is provided. The apparatus comprises a first circuit configured to generate a request based on, at least in part, data indicative of at least one channel condition of at least one communication channel of a first communication node. The request informs a second communication node about a presence of interference on the at least one communication channel caused by the second communication node. The apparatus further comprises a transmitter configured to transmit the request to the second communication node.

In another embodiment, a wireless communication apparatus operable in a communication system is provided. The apparatus comprises means for generating a request based on, at least in part, data indicative of at least one channel condition of at least one communication channel of a first communication node. The request informs a second communication node of interference on the at least one communication channel of the first communication node caused by the second communication node. The apparatus further comprises means for transmitting the request to the second communication node.

In yet another embodiment, a method of communicating in a communication system is provided. The method comprises generating a request based on, at least in part, data indicative of at least one channel condition of at least one communication channel of a first communication node. The request informs a second communication node of interference on the at least one communication channel of the first communication node caused by the second communication node. The method further comprises transmitting the request to the second communication node.

In a further embodiment, a computer program product comprising a computer-readable medium is provided. The computer-readable medium comprises code for causing a computer to generate a request based on, at least in part, data indicative of at least one channel condition of at least one communication channel of a first communication node. The request informs a second communication node of interference on the at least one communication channel of the first communication node caused by the second communication node. The computer-readable medium further comprises code for causing a computer to transmit the request to the second communication node.

In one embodiment, a wireless communication apparatus operable in a communication system is provided. The apparatus comprises a transmitter configured to transmit at least one wireless signal and a receiver configured to receive a request from a first communication device. The request indicates a presence of interference on at least one communication channel of a first communication node caused by the at least one wireless signal. The apparatus further comprises a first circuit configured to alter transmission of the at least one wireless signal based on, at least in part, the request.

In another embodiment, a wireless communication apparatus operable in a communication system is provided. The apparatus comprises means for transmitting at least one wireless signal and means for receiving a request from a first communication device. The request indicates a presence of interference on at least one communication channel of a first communication node caused by the at least one wireless signal. The apparatus further comprises means for altering transmission of the at least one wireless signal based on, at least in part, the request.

In yet another embodiment, a method of communicating in a communication system is provided. The method comprises transmitting at least one wireless signal and receiving a request from a first communication device. The request indicates a presence of interference on at least one communication channel of a first communication node caused by the at least one wireless signal. The method further comprises altering transmission of the at least one wireless signal based on, at least in part, the request.

In a further embodiment, a computer program product comprising a computer-readable medium is provided. The computer-readable medium comprises code for causing a computer to transmit at least one wireless signal and code for causing a computer to receive a request from a first communication device. The request indicates a presence of interference on at least one communication channel of a first communication node caused by the at least one wireless signal. The computer-readable medium further comprises code for causing a computer to alter transmission of the at least one wireless signal based on, at least in part, the request.

DETAILED DESCRIPTION

Figure 1:
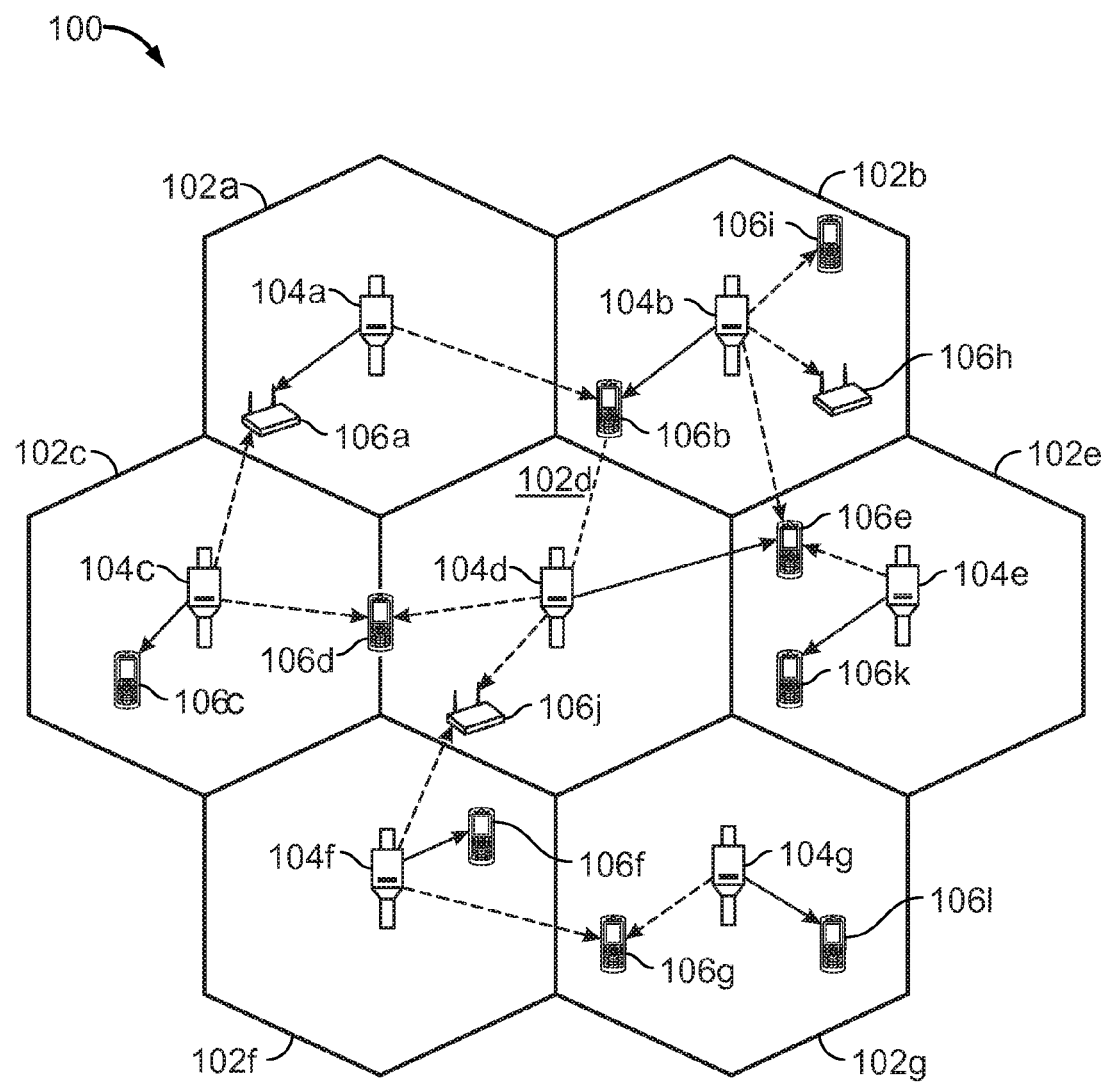
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3rd Generation (3G) networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102a through 102g. Communication coverage in cells 102a through 102g may be provided by one or more nodes 104a through 104g. Each of the nodes 104a through 104g may provide communication coverage to corresponding cells 102a through 102g. The nodes 104a through 104g may interact with a plurality of access terminals (ATs) 106a through 106l.

Each of the ATs 106a through 106l may communicate with one or more nodes 104a through 104g on a forward link (FL) and/or a reverse link (RL) at a given moment. A FL is a communication link from a node to an AT. A RL is a communication link from an AT to a node. The nodes 104a through 104g may be interconnected, for example, by appropriate wired or wireless interfaces and may be able to communicate with each other. Accordingly, each of the ATs 106a through 106l may communicate with another one of the ATs 106a through 106*l* through one or more nodes 104*a* through 104*g*. For example, the AT 106*j* may communicate with the AT 106*h* as follows. The AT 106*j* may communicate with the node 104*d*. The node 104*d* may then communicate with the node 104*b*. The node 104*b* may then communicate with the AT 106*h*. Accordingly, a communication is established between the AT 106*j* and the AT 106*h*.

The wireless communication network 100 may provide service over a large geographic region. For example, the cells 102*a* through 102*g* may cover only a few blocks within a neighborhood or several square miles in a rural environment. In one embodiment, each cell may be further divided into one or more sectors (not shown).

As described above, a node (e.g., 104*a*) may provide an access terminal (AT) (e.g., AT 106*a*) access within its coverage area to a communications network, such as, for example the internet or a cellular network.

An AT (e.g., 106*a*) may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106*a*, 106*h*, and 106*j* comprise routers. ATs 106*b* through 106*g*, 106*i*, 106*k*, and 106*l* comprise mobile phones. However, each of ATs 106*a* through 106*l* may comprise any suitable communication device.

Figure 2:
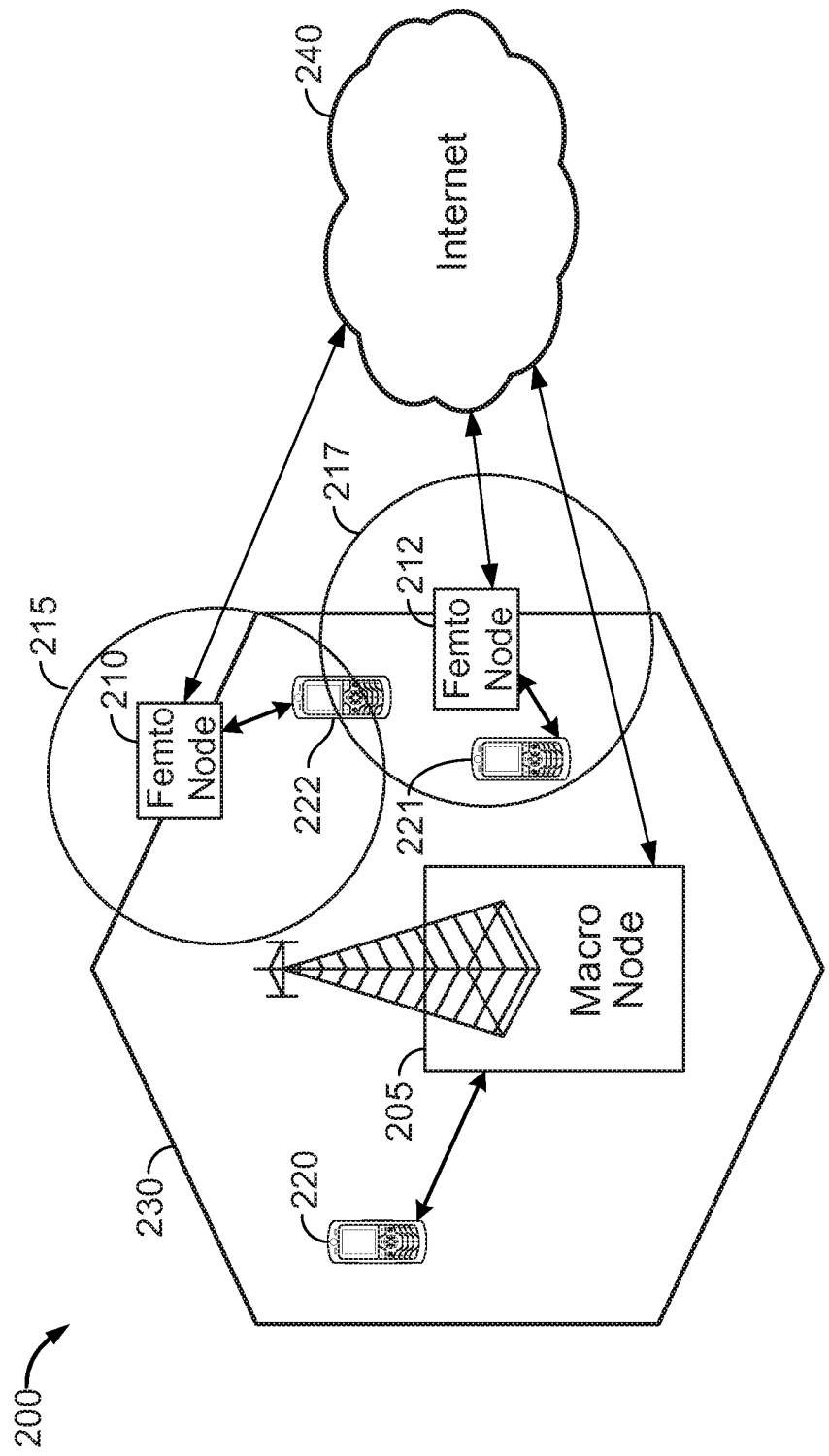
FIG. 2 illustrates exemplary interoperations of two or more communication networks.

FIG. 2 illustrates exemplary interoperations of two or more communication networks. It may desirable for an AT 220 to transmit information to and receive information from another AT such as AT 221. FIG. 2 illustrates a manner in which the ATs 220, 221, and 222 may communicate with each other. As shown in FIG. 2, the macro node 205 may provide communication coverage to access terminals within a macro area 230. For example, the AT 220 may generate and transmit a message to the macro node 205. The message may comprise information related to various types of communication (e.g., voice, data, multimedia services, etc.). The AT 220 may communicate with the macro node 205 via a wireless link. The macro node 205 may communicate with a network 240 via a wired link or via a wireless link. The femto nodes 210 and 212 may also communicate with the network 240 via a wired link or via a wireless link. The AT 222 may communicate with the femto node 210 via a wireless link and the AT 221 may communicate with the femto node 212 via a wireless link.

The macro node 205 may also communicate with devices such as servers (not shown in FIG. 2) and switching centers (not shown in FIG. 2) through the network 240. For example, the macro node 205 may transmit the message received from the AT 220 to a switching center (not shown in FIG. 2), which may forward the message to another network. The network 240 may also be used to facilitate communication between the ATs 220, 221, and 222. For example, the AT 220 may be in communication with the AT 221. The AT 220 may transmit a message to the macro node 205. The macro node may forward the message to the network 240. The network 240 may forward the messages to the femto node 212. The femto node 212 may forward the message to the AT 221. Similarly, the reverse path may be followed from the AT 221 to the AT 220. In another example, the AT 221 may be in communication with the AT 222. The AT 221 may transmit a message to the femto node 212. The femto node 212 may forward the message to the network 240. The network 240 may forward the message to the femto node 210. The femto node 210 may forward the message to the AT 222. Similarly, the reverse path may be followed from the AT 222 to the AT 221.

In one embodiment, the femto nodes 210, 212 may be deployed by individual consumers and placed in homes, apartment buildings, office buildings, and the like. The femto nodes 210, 212 may communicate with the ATs in a predetermined range (e.g., 100*m*) of the femto nodes 210, 212 utilizing a predetermined cellular transmission band. In one embodiment, the femto nodes 210, 212 may communicate with the network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

As discussed above, the coverage area of two femto nodes may overlap as shown in FIG. 2. The femto node 210 has a first coverage area 215. The first coverage area 215 may comprise one or more geographical areas in which the AT 222 may access the communication network 240. The first coverage area 215 may also comprise one or more geographical areas in which the AT 222 may communicate with the femto node 210. The femto node 212 has a second coverage area 217. The second coverage area 217 may comprise one or more geographical areas in which the AT 221 may access the communication network 240. The second coverage area 217 may also comprise one or more geographical areas in which the AT 221 may communicate with the femto node 212. The first coverage area 215 and the second coverage area 217 overlap. The AT 222 may be located within the overlapping regions of the first coverage area 215 and the second coverage area 217.

The AT 222 may be in communication with the femto node 210 via a communication link as shown in FIG. 2. The AT 221 may be in communication with the femto node 212 via another communication link as shown in FIG. 2. The femto node 212 may be transmitting wireless signals within the second coverage area 217. The wireless signals transmitted by the femto node 212 may be received by the AT 222, which is located within the second coverage area 217. The wireless signals transmitted by the femto node 212 may interfere with the wireless signals transmitted by the femto node 210. The interference caused by the wireless signals transmitted by the femto node 212 may cause problems in the wireless link between the femto node 210 and the AT 222. For example, the AT 222 may drop a voice and/or data call. In another example, the wireless signals received by the AT 222 from the femto node 210 may weaker due to the interference caused by the wireless signals from the femto node 212. In yet another example, the AT 222 may decrease a data rate of the wireless link between the AT 222 and the femto node 210 due to the interference caused by the wireless signals from the femto node 212.

The operator of the femto node 210 may subscribe to a mobile service, such as, for example, 3G mobile service, offered through the communication network 240 (e.g., a mobile operator core network). In addition, the access terminal 222 may be capable of operating both in macro environments (e.g., macro areas) and in smaller scale (e.g., residential, femto areas, pico areas, etc.) network environments. In other words, depending on the current location of the access terminal 222, the access terminal 222 may access the communication network 240 by the macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing access terminals 222.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 205) and/or another femto node (e.g., femto node 212).

In one embodiment, the access terminal 222 may be configured to connect to a particular (e.g., preferred) femto node (e.g., a home femto node of the access terminal 222) whenever the access terminal 222 is within communication range of the femto node. For example, the access terminal 222 may communicate with only the femto node 210 when the access terminal 222 is within the femto area 215.

In another embodiment, the access terminal 221 is communicating with a node but is not communicating with a preferred node (e.g., as defined in a preferred roaming list). In this embodiment, the access terminal 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The access terminal 222 may limit the BSR to scanning over one or more specific bands and/or channels. Upon discovery of a preferred femto node (e.g., femto node 210), the access terminal 222 selects the femto node 210 for communicating with to access the communication network 240 within the femto area 215.

In one embodiment, a node may only provide certain services to certain access terminals. Such a node may be referred to as a "restricted" or "closed" node. In wireless communication networks comprising restricted femto nodes, a given access terminal may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 3:
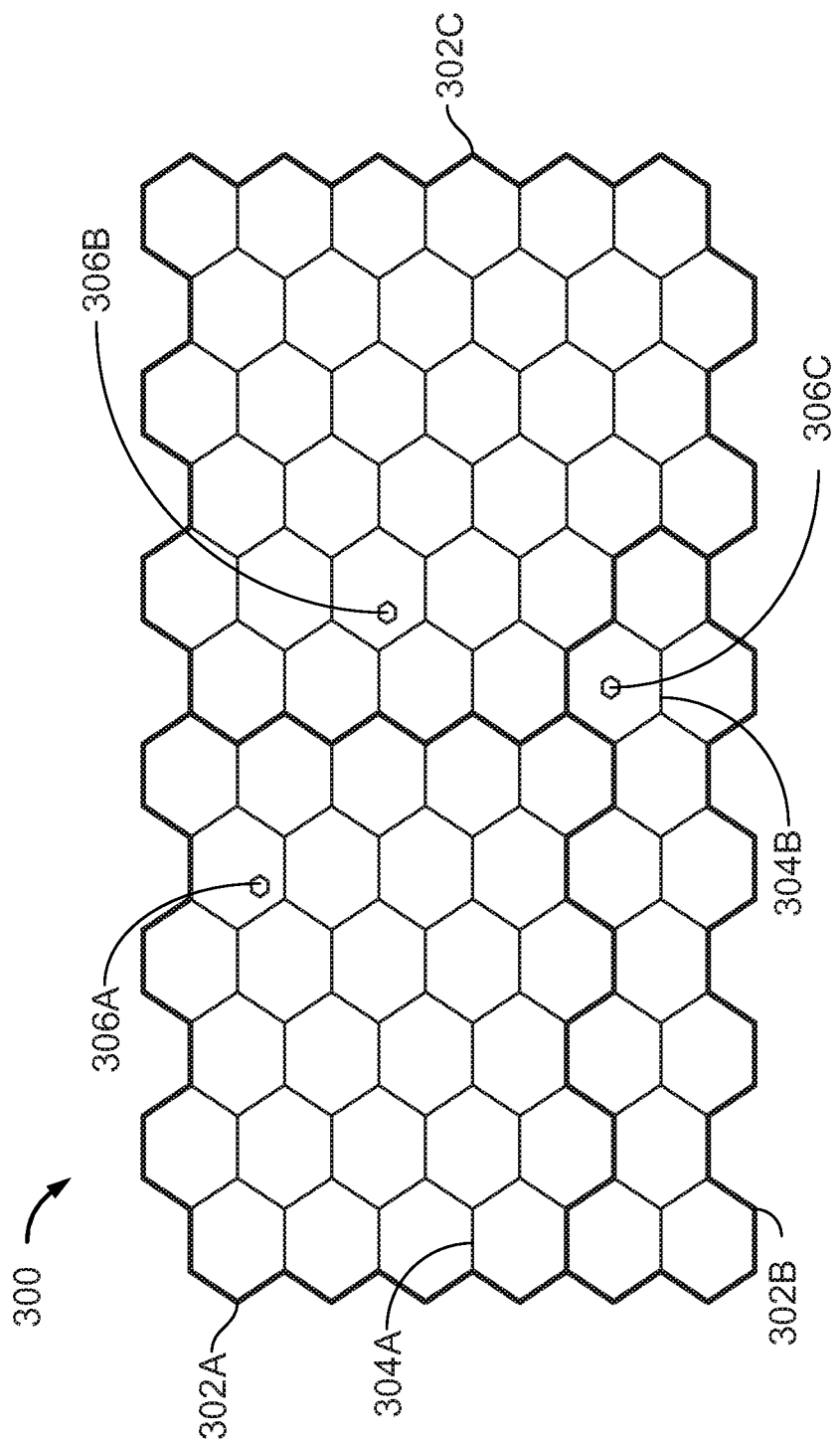
FIG. 3 illustrates exemplary coverage areas of the wireless communication networks shown in FIG. 1.

FIG. 3 illustrates exemplary coverage areas of the wireless communication networks 100 shown in FIG. 1. The coverage area 300 may comprise one or more geographical areas in which an AT (e.g., the AT 220 shown in FIG. 2) may access a network (e.g., the communication network 240 shown in FIG. 2). As shown the coverage area 300 comprises several tracking areas 302A through 302C (or routing areas or location areas). Each of the tracking areas 302A through 302C comprises several macro areas such as 304A and 304B, which may be similar to the macro area 230 described above with respect to FIG. 2. Here, areas of coverage associated with tracking areas 302A, 302B, and 302C are shown as delineated by bolded lines, and the macro areas such as 304A and 304B are represented by hexagons. The tracking areas 302A through 302C may also comprise femto areas such as femto areas 306A through 306C, which may be similar to the femto area 230 described above with respect to FIG. 2. In this example, each of the femto areas (e.g., femto area 306C) is depicted within a macro area (e.g., macro area 304B). It should be appreciated, however, that a femto area (e.g., femto area 306C) may not lie entirely within a macro area (e.g., macro area 304B). In practice, a large number of femto areas (e.g., femto area 306C) may be defined with a given tracking area (e.g., tracking area 302B) or macro area (e.g., macro area 304B). Also, one or more pico areas (not shown) may be defined within a given tracking area (e.g., tracking area 302B) or macro area (e.g., macro area 304B).

Figure 4:
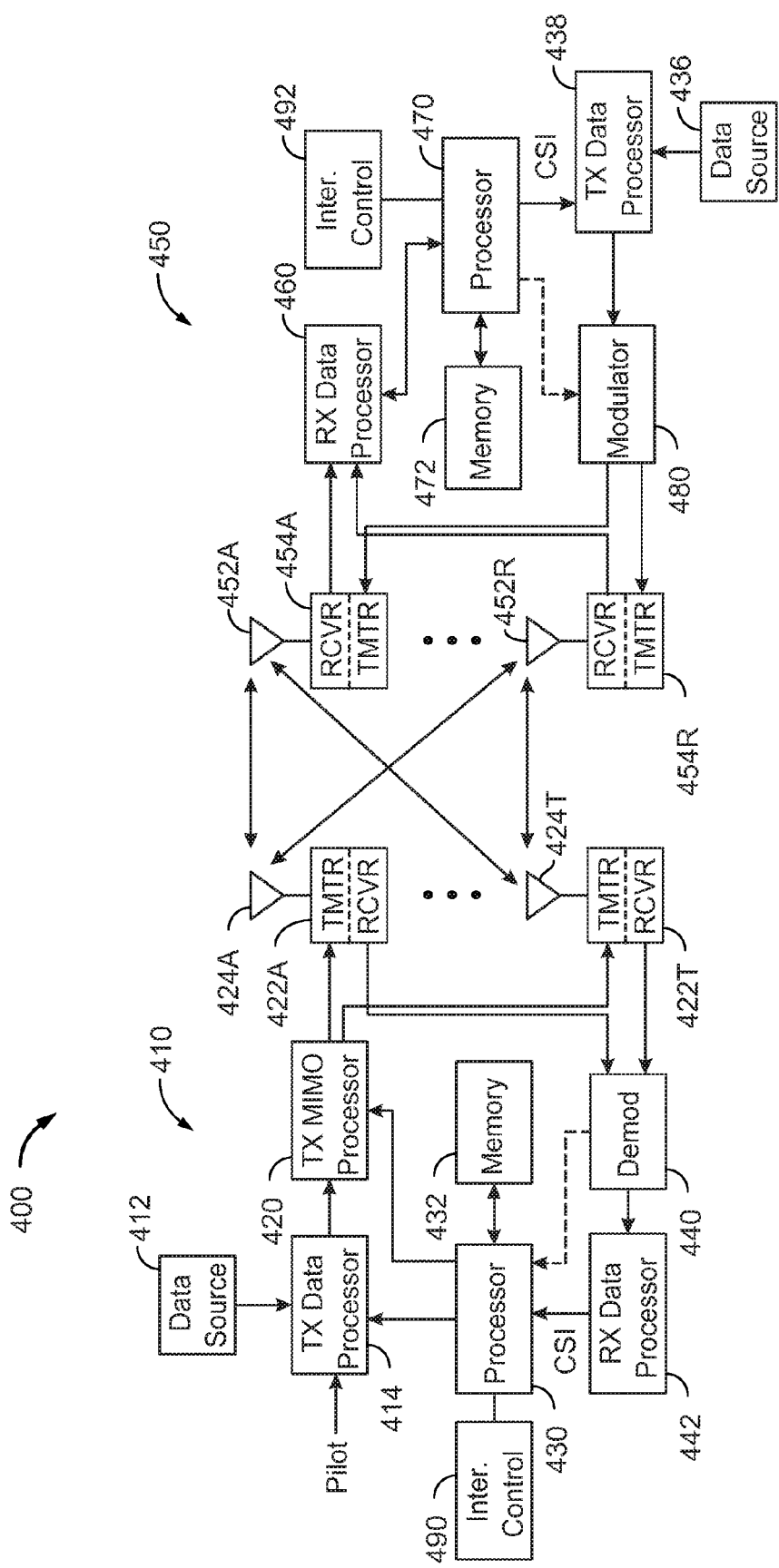
FIG. 4 is a functional block diagram of a first exemplary femto node and a first exemplary access terminal in one of the communication networks of FIG. 2.

FIG. 4 is a functional block diagram of a first exemplary femto node 410 and a first exemplary access terminal 450 in one of the communication networks of FIG. 2. As shown, a MIMO system 400 comprises a femto node 410 and an access terminal 450 (e.g., the AT 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beamforming weights to the symbols of the data streams and to the antenna from which the symbol is being transmitted.

Each of transceivers 422A through 422T receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the femto node 450, the transmitted modulated signals are received by NR antennas 452A through 452R and the received signal from each of antennas 452A through 452R is provided to a respective transceiver ("XCVR") 454A through 454R. Each of transceivers 454A through 454R conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454A through 454R based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the femto node 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the femto node 410.

At the femto node 410, the modulated signals from the femto node 450 are received by the antennas 424A through 424T. Further, the transceivers 422A through 422T condition the modulated signals. A demodulator ("DEMOD") 440 demodulates the modulated signals. A RX data processor 442 processes the demodulated signals and extracts the reverse link message transmitted by the femto node 450. The processor 430 then determines which pre-coding matrix to use for determining the beam-forming weights. Further, the processor 430 processes the extracted message.

Further, the femto node 410 and/or the femto node 450 may comprise one or more components that perform interference control operations as taught herein. For example, an interference ("INTER") control component 490 may cooperate with the processor 430 and/or other components of the femto node 410 to send/receive signals to/from another device (e.g., femto node 450) as taught herein. Similarly, an interference control component 492 may cooperate with the processor 470 and/or other components of the femto node 450 to send/receive signals to/from another device (e.g., femto node 410). It should be appreciated that for each femto node 410 and 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5:
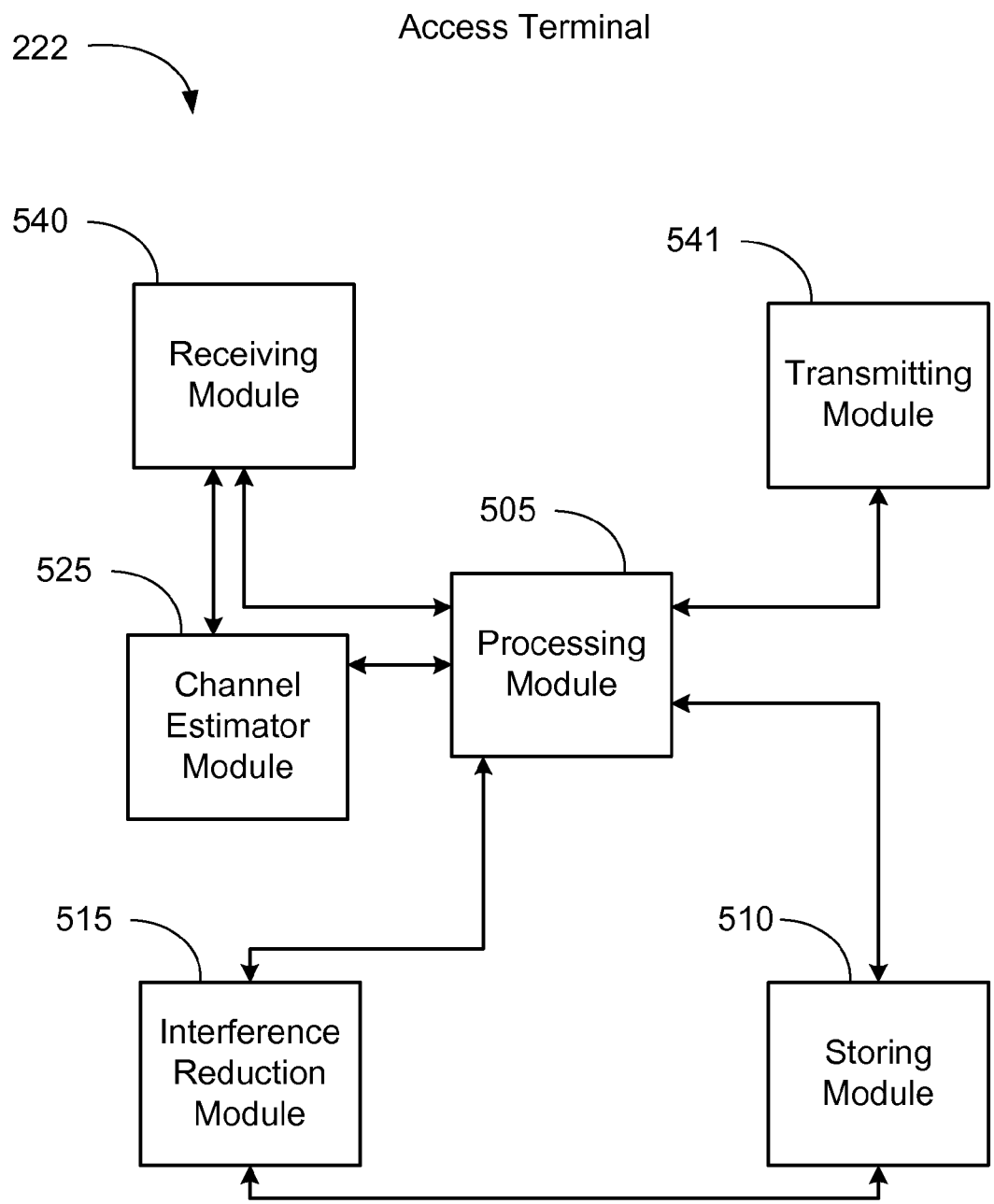
FIG. 5 is a functional block diagram of a second exemplary access terminal in one of the communication networks of FIG. 2.

FIG. 5 is a functional block diagram of a second exemplary access terminal 222 in one of the communication networks of FIG. 2. As discussed above in FIG. 2, the AT 222 may be a mobile phone used to communicate information to and/or from the femto node 210.

The AT 222 may comprise a receiving module 540 configured to receive an inbound wireless message and/or wireless signals from the femto node 210 and/or other devices. The receiving module 540 may be configured to measure conditions of the wireless link between the AT 222 and the femto node 210. In one embodiment, the receiving module 540 may measure at least one of a data rate, noise, signal power, and signal to noise ratio of the wireless link between the femto node 210 and the AT 222. In another embodiment, the receiving module 540 may provide data indicative of the conditions of the wireless link (e.g., noise level, signal power, and/or signal to noise ratio) to a processing module 505. In one embodiment, the receiving module 540 may also measure signals received from other femto nodes (e.g., femto node 212). The AT 222 may also comprise a channel estimator module 525 which is coupled to the receiving module 540. In one embodiment, the channel estimator module 525 may measure at least one of a data rate, noise, signal power, and signal to noise ratio of the wireless link between the femto node 210 and the AT 222 using the receiving module 540. In another embodiment, the channel estimator module 525 may measure conditions of the wireless link between the AT 222 and the femto node 210. In a further embodiment, the channel estimator module 525 may provide data indicative of the conditions of the wireless link to a processing module 505. The channel estimator module 525 may be coupled to the storing module 510 to store, read and access data in the storing module 510. The transmitting module 541 may be configured to transmit an outbound wireless message and/or wireless signals to the femto node 210 and/or other devices. For example, the transmitting module 541 may be configured to transmit an access probe (e.g., a registration request to determine if access is allowed to the femto node) to the femto node 210 in order to establish the wireless link between the AT 222 and the femto node 210.

A processing module 505 may be coupled to both the receiving module 540 and the transmitting module 541. The processing module 505 may be configured to process information for storage, transmission, and/or for the control of other components of the AT 222. The processing module 505 may further be coupled to a storing module 510. The storing module 510 may be configured to store information before, during or after processing. The receiving module 540 may pass the inbound wireless message to the processing module 505 for processing. The processing module 505 may store the inbound wireless message in the storing module 510. The processing module 505 may also read information from or write information to the storing module 510. The processing module 505 may process the outbound wireless message passing the outbound wireless message to the transmitting module 541 for transmission. The processing module 505 may obtain the outbound wireless message from the storing module 510 and/or may use data obtained from the storing module 510 to process the outbound wireless message. In one embodiment, the processing module 505 may obtain data indicative of the conditions of the wireless link from the receiving module 540. The processing module 505 may process the data indicative of the conditions of the wireless link. In another embodiment, the processing module 505 may also store the data indicative of the conditions of the wireless link in the storing module 510.

The processing module 505 may also be coupled to an interference reduction module 515. The interference reduction module 515 may be configured to mitigate and/or reduce the amount of interference on the wireless link between the femto node 210 and the AT 222. In one embodiment, the interference reduction module 515 may obtain data indicative of the conditions of the wireless link and/or data indicative of the strength of signals received from other femto nodes (e.g., femto node 212) from the processing module 505. In another embodiment, the interference reduction module 515 may obtain data indicative of the conditions of the wireless link and/or data indicative of the strength of signals received from other femto nodes (e.g., femto node 212) from the storing module 510. In one embodiment, the interference reduction module 515 may use the data indicative of the conditions of the wireless link and/or data indicative of the strength of signals received from other femto nodes (e.g., femto node 212) to mitigate and/or reduce the amount of interference on the wireless link between the femto node 210 and the AT 222. For example, the interference reduction module 515 may generate a cooperation request (e.g., a message used to indicate to an interfering femto cell that the interfering femto cell is causing interference). The AT 222 may transmit the cooperation request generated by the interference reduction module 515 to an interfering femto node (e.g., femto node 212) in order to reduce the amount of interference on the wireless link between the AT 222 and the femto node 210 caused by the interfering femto node (e.g., femto node 212). In one embodiment, the cooperation request may be sent via the transmitting module 541 as part of a registration message. In another embodiment, the cooperation request may be sent via the transmitting module 541 as a separate message. For further information on functions that the interference reduction module 515 may perform, see the written description for FIGS. 7-11 and 12.

In one embodiment, the cooperation request may comprise information which may be used by the interfering femto node (e.g., femto node 212). For example, the cooperation request may comprise information such as an identifier for the AT 222. In another example, the cooperation request may comprise a location of the AT 222. In a further example, the cooperation request may comprise data indicative of the amount of noise the AT 222 may experience on the wireless link between the AT 222 and the femto node 210. In yet another example, the cooperation request may comprise spatial direction information (e.g., information indicating a spatial direction or a wireless signal). In a further example, the registration request may comprise data indicative of a channel condition including, but not limited to, a data rate, a measured channel quality, a reference signal power, a pilot channel power, an interference level, a noise level, a signal power level, and a signal to noise ratio. In another example, the cooperation request may comprise data indicative of the amount of signal strength the AT 222 may measure from the femto node 210.

The receiving module 540 and the transmitting module 541 may comprise an antenna (not shown in FIG. 5). The receiving module 540 may be configured to demodulate the inbound wireless messages coming from femto node 210 and/or the macro node 205. The transmitting module 541 may be configured to modulate the outbound wireless message going to the femto node 210 and/or the macro node 205. The outbound wireless messages may be transmitted via the antenna and the inbound wireless messages may be received via the antenna. The antenna may be configured to communicate with the femto node 210 and macro node 205 over one or more channels. The outbound and/or inbound wireless messages may comprise voice and/or data-only information (collectively referred to herein as "data"). The processing module 505 and/or the interference reduction module 515 may provide data to be transmitted.

The storing module 510 may comprise processing module cache, including a multi-level hierarchical cache in which different levels have different capacities and access speeds. The storing module 510 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the access terminal 222 need not be separate structural elements. For example, the processing module 505 and the storing module 510 may be embodied in a single chip. The processing module 505 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the AT 222, such as the processing module 505 and the interference reduction module 515 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 222 may also be implemented as a combination of computing devices, e.g., a combination of a DSP and a microprocessor, a plurality of microprocessors, one or more microprocessors in conjunction with a DSP communication, or any other such configuration.

Figure 6:
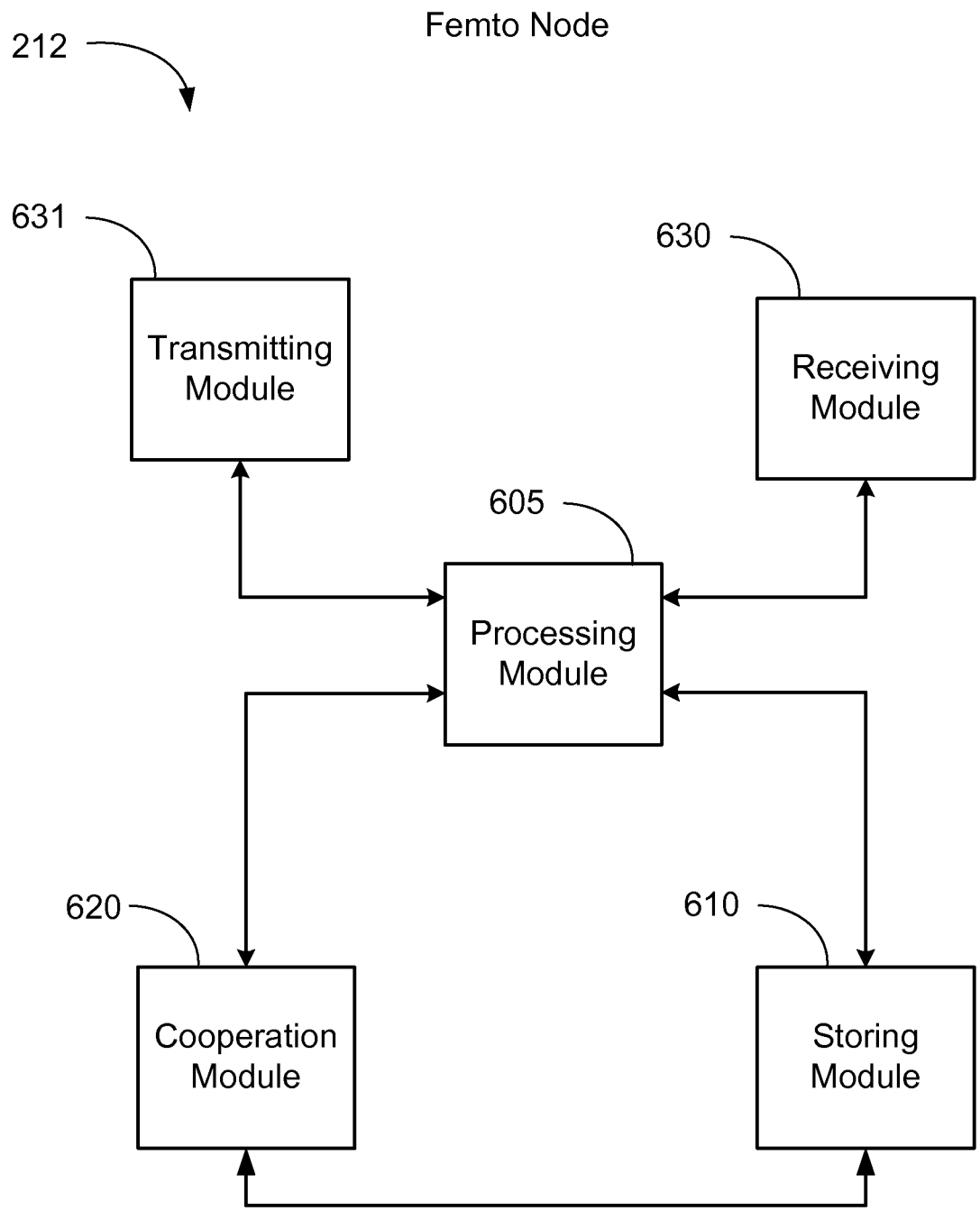
FIG. 6 is a functional block diagram of a second exemplary femto node in one of the communication networks of FIG. 2.

FIG. 6 is a functional block diagram of a second exemplary femto node 212 in one of the communication networks of FIG. 2. As discussed above with respect to FIG. 2, the femto node 212 may be in communication with the AT 221.

The femto node 212 may comprise a receiving module 630 configured to receive wireless signals (e.g., inbound wireless messages) transmitted by the AT 222 and/or other devices. In one embodiment, the receiving module is configured to receive a cooperation request from the AT 222. The femto node 212 may also comprise a transmitting module 631. The transmitting module 631 may be configured to transmit wireless signals to the AT 222. The transmitting module 631 may also send an outbound message to the AT 222. The transmitting module 631 may also send outbound messages to other devices. The receiving module 630 and the transmitting module 631 may be coupled to the processing module 605. The receiving module 630 and the transmitting module 631 may also be configured to receive an inbound wired message from and pass an outbound message to the network 240, respectively. The receiving module 630 may pass the inbound wired message to the processing module 605 for processing. The receiving module 630 may also pass the cooperation request to the processing module 605 for processing. The processing module 605 may process and pass the wired outbound message to the transmitting module 631 for transmission to the network 240.

The processing module 605 may further be coupled, via one or more buses, to a storing module 610. The processing module 605 may read information from or write information to the storing module 610. For example, the storing module 610 may be configured to store a cooperation request received from the processing module 605 and the receiving module 630. The processing module 605 may also be configured to control other components of the femto node 212. The processing module 605 may also be coupled to a cooperation module 620. The cooperation module 620 may also process the cooperation request received from the processing module 605 and the receiving module 630. The cooperation module 620 may be configured to mitigate and/or reduce the amount of interference caused by the femto node 212 on the wireless link between the AT 222 and the femto node 210, based on the cooperation request. For further information regarding the functions the cooperation module 620 may perform and how the cooperation module may mitigate and/or reduce the amount of interference, see the written description for FIGS. 7-11 and 13.

The receiving module 630 and the transmitting module 631 may comprise one or more antennas. The receiving module 630 may be configured to measure the received signal strength from AT 222 on each of the one or more antennas. In one embodiment, the received signal strength may be used to predict the spatial direction of the AT 222 by the processing module 605. The processing module 605 may cause the transmitting module 631 to alter transmission of at least one signal transmitted from the one or more antennas such that the interference on communication channel between the AT 222 and the femto node 210 is reduced and/or mitigated (See e.g., the description for FIGS. 7-11). The transmitting module 631 may be configured to modulate the wireless outbound messages going to the AT 222. The receiving module 631 may be configured to demodulate the inbound messages coming from AT 222. The wireless outbound messages may be transmitted via the at least one antenna and the inbound message may be received via the at least one antenna. The at least one antenna may be configured to send and/or receive the outbound and inbound wireless messages to and from the AT 222 over one or more channels. The outbound and inbound messages may comprise voice and/or data-only information (collectively referred to herein as "data"). The receiving module 630 may demodulate the data received. The transmitting module 631 may modulate data to be sent from the femto node 212 via the wireless network interface 610. The processing module 605 may provide data to be transmitted.

In another embodiment, the femto node 212 may further comprise a moving module 640. The moving module may be coupled to the processing module 605 and the cooperation module 620. The moving module 640 may be configured to change the orientation of the at least one antenna of the femto node 212. The moving module may comprise at least one of a circuit, a motor, a magnetic actuator (e.g., a device that moves an object using a magnetic force), a pneumatic actuator, or any means for physically moving the at least one antenna. The moving module 640 may change the orientation of the at least one antenna of the femto node 212 based on, at least in part, the cooperation request. The moving module 640 may also change the orientation of the at least one antenna of the femto node 212 based on instructions received from the cooperation module 620. For example, the cooperation module 620 may process the cooperation request and may provide instructions to the moving module 640 regarding how and/or where to move the at least one antenna of the femto node 212. For further information on functions that the generating module 530 may perform, see the written description for FIG. 11.

The receiving module 630 and the transmitting module 631 may comprise a modem. The modem may be configured to modulate the outbound wired messages going to the network 240. The modem may also be configured to modulate the inbound wired messages coming from the network 240. The receiving module 630 may demodulate data received. The demodulated data may be transmitted to the processing module 605. The transmitting module 631 may modulate data to be sent from the femto node 212 via the wired network interface 630. The processing module 605 and/or the cooperation module 620 may provide data to be transmitted.

The storing module 610 may comprise processing module cache, including a multi-level hierarchical cache in which different levels have different capacities and access speeds. The storing module 610 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the femto node 212 need not be separate structural elements. For example, the processing module 605 and the storing module 610 may be embodied in a single chip. The processing module 605 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the femto node 212, such as the processing module 605 and the cooperation module 620, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 212 may also be implemented as a combination of computing devices, e.g., a combination of a DSP and a microprocessor, a plurality of microprocessors, one or more microprocessors in conjunction with a DSP communication, or any other such configuration.

Figure 7:
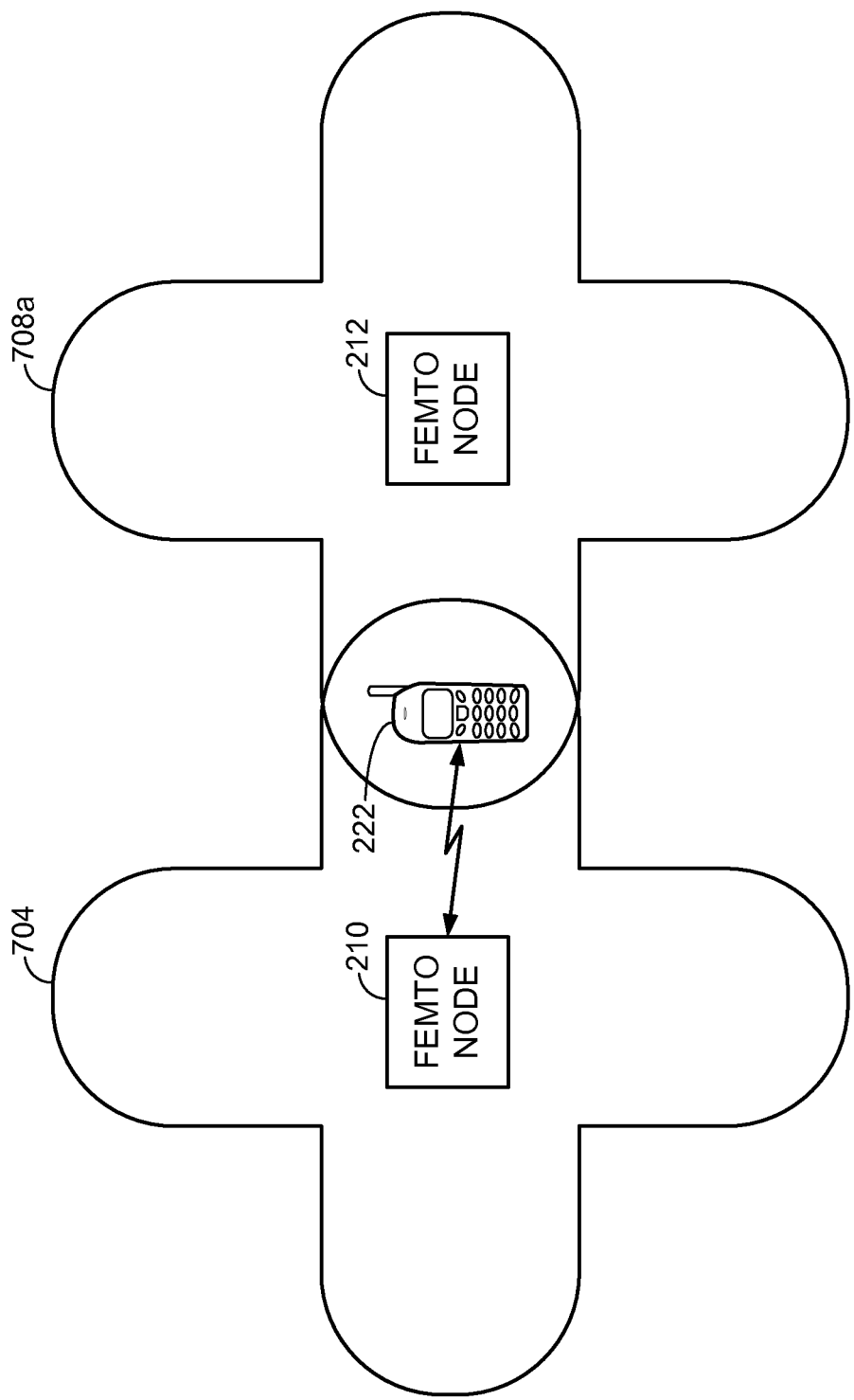
FIG. 7 illustrates a first group of exemplary coverage areas for two femto nodes in one of the communication networks of FIG. 2.

FIG. 7 illustrates a first group of exemplary coverage areas 704 and 708a for femto nodes 210 and 212 in one of the communication networks of FIG. 2. The femto node 210 has a coverage area 704. The femto node 212 has a coverage area 708a. In one embodiment, the coverage area 704 and the coverage area 708a may overlap. In another embodiment, the AT 222 may be located within the overlapping area between the coverage area 704 and the coverage area 708a. Thus, the AT 222 may be receiving wireless signals from both the femto node 210 and the femto node 212. As discussed above in FIG. 2, the AT 222 may communicate with the femto node 210 via a wireless communication link. The femto node 212 may also be transmitting wireless signals to another device (e.g., AT 221 shown in FIG. 2). In one embodiment, the wireless signals transmitted by the femto node 212 to another device (e.g., AT 221 shown in FIG. 2) may cause interference on the wireless link between the AT 222 and the femto node 210.

In one embodiment, the AT 222 may measure the conditions of the wireless link between the femto node 210 and the AT 222. In another embodiment, the AT 222 may also measure the strength of the wireless signals transmitted by the femto node 212. The AT 222 may determine that the interference on the wireless link between the AT 222 and the femto node 210 is caused by the femto node 212. In another embodiment, the AT 222 may determine the spatial direction of the wireless signal transmitted by the femto node 212, which may be causing the interference. For example, the AT 222 may determine that wireless signal transmitted by the femto node 212 which is causing the interference is originating from the left side of the AT 222. In another example, the AT 222 may use a spherical (e.g., a 3-dimensional) and/or a circular (e.g., a 2-dimensional) coordinate system in order to determine where the interfering signal transmitted by the femto node 212, originates from. In one embodiment, the AT 222 may attempt to register (e.g., establish communication with) with the femto node 212 using a registration request. The registration request may contain a cooperation request. In another embodiment, the AT 222 may send a separate message containing the cooperation request to the femto node 212.

In one embodiment, after receiving the cooperation request, the femto node 212 may ignore the cooperation request. In another embodiment, the femto node 212 may attempt to mitigate and/or reduce the amount of interference on the wireless link between the femto node 210 and the AT 222. For example, the femto node 212 may perform beamforming (discussed below in conjunction with FIGS. 7 and 8). In another example, the femto node 212 may periodically cease transmission and/or reduce the power of the wireless signal the femto node 212 is transmitting (discussed below in conjunction with FIGS. 9 and 10). In yet another example, the femto node may physically change the orientation of at least one antenna (discussed below in conjunction with FIG. 11).

Figure 8:
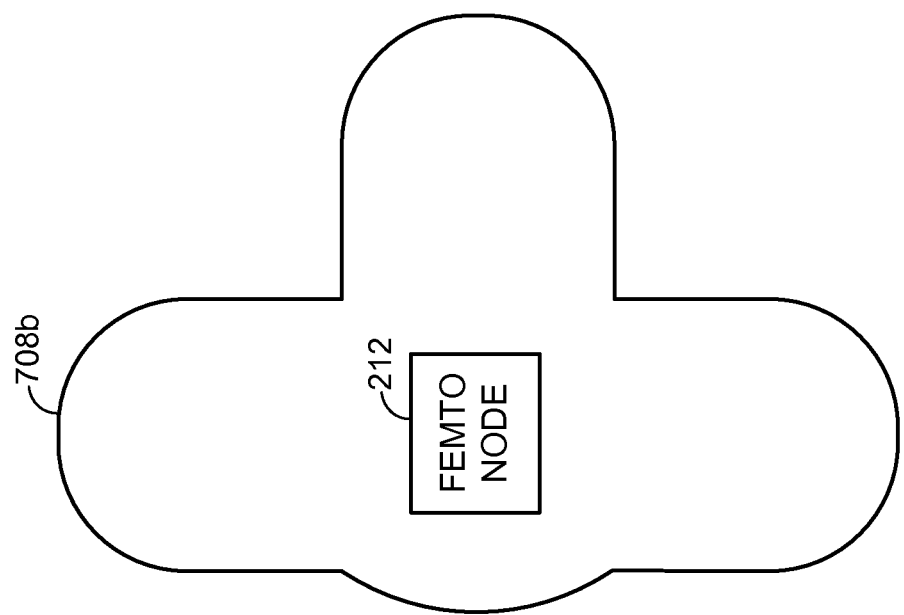
FIG. 8 illustrates a second group of exemplary coverage areas for two femto nodes in one of the communication networks of FIG. 2.
Figure 8:
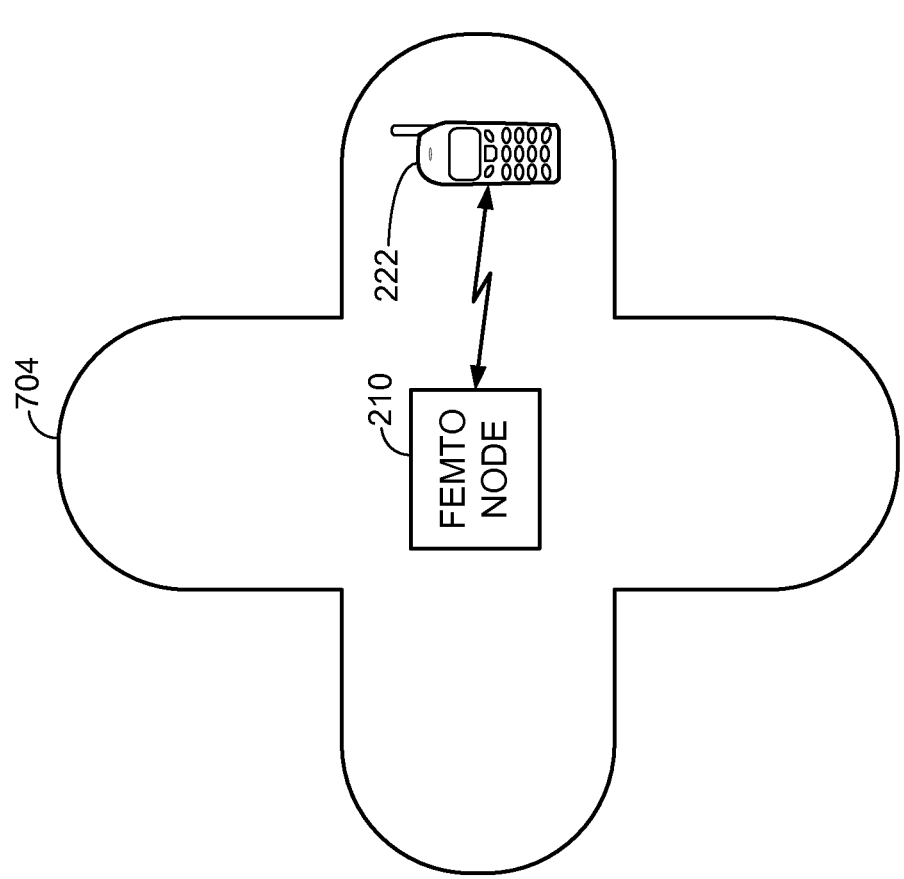

FIG. 8 illustrates a second group of exemplary coverage areas 704 and 708b for femto nodes 210 and 212 in one of the communication networks of FIG. 2. As discussed above in FIG. 7, the femto node 212 may receive a cooperation request from the AT 222. The cooperation request may indicate that the AT 222 is experiencing interference on the wireless link between the femto node 210 and the AT 222. The femto node 212 may respond to the cooperation request by modifying its coverage area. The femto node 212 may modify its coverage area by changing the coverage area from the coverage area 708a shown in FIG. 7 to the coverage area 708b shown in FIG. 8. The coverage area 705 and the coverage area 708b do not overlap. Thus, the AT 222 may receive wireless signals from the femto node 210 and may not receive wireless signals from the femto node 212. The change in the coverage area for the femto node 212 from the coverage area 708a to the coverage area 708b may mitigate and/or reduce the amount of interference the AT 222 experiences on the wireless link between the AT 222 and the femto node 210.

In one embodiment, the femto node 212 may modify its coverage area from the coverage area 708a to the coverage area 708b using beamforming (e.g., using interference to modify the direction of wireless signals from an antenna). In one embodiment, the femto node 212 may comprise a plurality of antennas. In another embodiment, the femto node 212 may change the phase and/or the amplitude (e.g., gain coefficients) of a signal transmitted from one of the plurality of antennas, after receiving the cooperation request from the AT 222. In yet another embodiment, the femto node 212 may change the phases and/or amplitudes of a plurality of signals transmitted from multiple antennas. For example, the femto node 212 may change the phase of a first signal transmitted from a first antenna and the amplitude of a second signal transmitted from a second antenna. In another example, the femto node 212 may change the phase of a first signal transmitted from a first antenna and the phase and amplitude of a second signal transmitted from a second antenna. In yet another example, the femto node 212 may change the phase of a first signal transmitted from a first antenna, the phase and amplitude of a second signal transmitted from a second antenna, and the amplitude of a third signal transmitted from a third antenna. By modifying the phases and/or amplitudes of at least one signal from at least one antenna, the femto node 212 may create a pattern of constructive and destructive interference which may change the coverage area of the femto node 212 (e.g., direct the beam and/or wireless signal from the antenna in another direction).

In one embodiment, the femto node 212 may only comprise one antenna. The femto node 212 may modify its coverage area by decreasing the signal power of the wireless signal transmitted by the antenna. In another embodiment, the femto node may modify its coverage area by change the phase and/or amplitude of the signal transmitted by the antenna.

In another embodiment, the cooperation request sent by the AT 222 to the femto node 212 may comprise data indicative of a time value. The data indicative of a time value may be used by the femto node 212 to determine how long the femto node 212 may maintain its beamforming. For example, the cooperation request may contain a time value of 60 seconds. The femto node 212 may change its coverage area from the coverage area 708a to the coverage area 708b for a period of 60 seconds. After the period of 60 seconds, the coverage area of the femto node 212 may revert from the coverage are 708b back to the coverage area 708a. Any period time may be sent in the cooperation request. For example, the cooperation request may contain a time value of 1 second, 20 seconds, 98 seconds etc.

In one embodiment, the AT 222 may periodically send cooperation requests to the femto node 212 in order inform the femto node 212 that the femto node 212 should continue beamforming. For example, while the AT 222 is in a voice call with the femto node 210, it may periodically send cooperation requests to the femto node 212 in order to minimize interference on the wireless link during the voice call. After the AT 222 terminates the voice call with the femto node 210, the AT 222 may stop sending cooperation requests to the femto node 212, since the AT 222 has terminated the wireless link between the femto node 210 and the AT 222. The femto node 212 may revert its coverage area from the coverage area 708b back to the coverage area 708a after it stops receiving periodic cooperation requests from the femto node 212.

Figure 9:
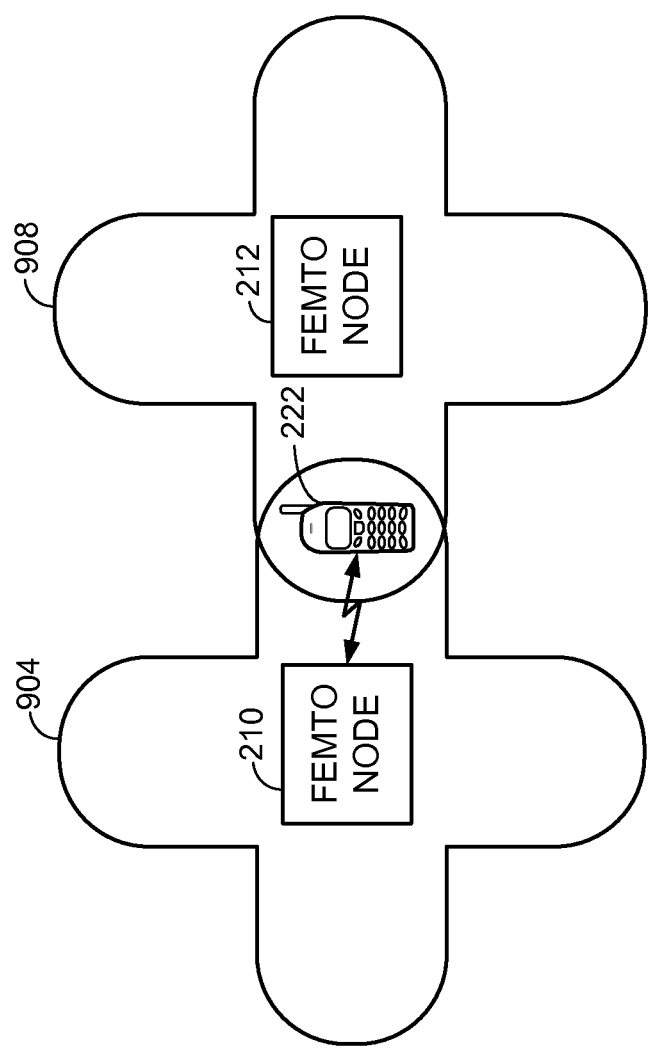
FIG. 9 illustrates a third group of exemplary coverage areas for two femto nodes in one of the communication networks of FIG. 2 at a first point in time.

FIG. 9 illustrates a third group of exemplary coverage areas for femto nodes in one of the communication networks of FIG. 2 at a first point in time. At the first point in time, the femto node 210 has a coverage area 904. The femto node 212 has a coverage area 908. In one embodiment, the coverage area 904 and the coverage area 908 may overlap. In another embodiment, the AT 222 may be located within the overlapping area between the coverage area 904 and the coverage area 908. Thus, the AT 222 may be receiving wireless signals from both the femto node 210 and the femto node 212. As discussed above in FIG. 2, the AT 222 may communicate with the femto node 210 via a wireless communication link. The femto node 212 may also be transmitting wireless signals to another device (e.g., AT 221 shown in FIG. 2). In one embodiment, the wireless signals transmitted by the femto node 212 to another device (e.g., AT 221 shown in FIG. 2) may cause interference on the wireless link between the AT 222 and the femto node 210.

In one embodiment, the AT 222 may measure the conditions of the wireless link between the femto node 210 and the AT 222. In another embodiment, the AT 222 may also measure the strength of the wireless signals transmitted by the femto node 212. The AT 222 may determine that the interference on the wireless link between the AT 222 and the femto node 210 is caused by the femto node 212. In one embodiment, the AT 222 may attempt to register (e.g., establish communication with) with the femto node 212 using a registration request. The registration request may contain a cooperation request. In another embodiment, the AT 222 may send a separate message containing the cooperation request to the femto node 212.

Figure 10:
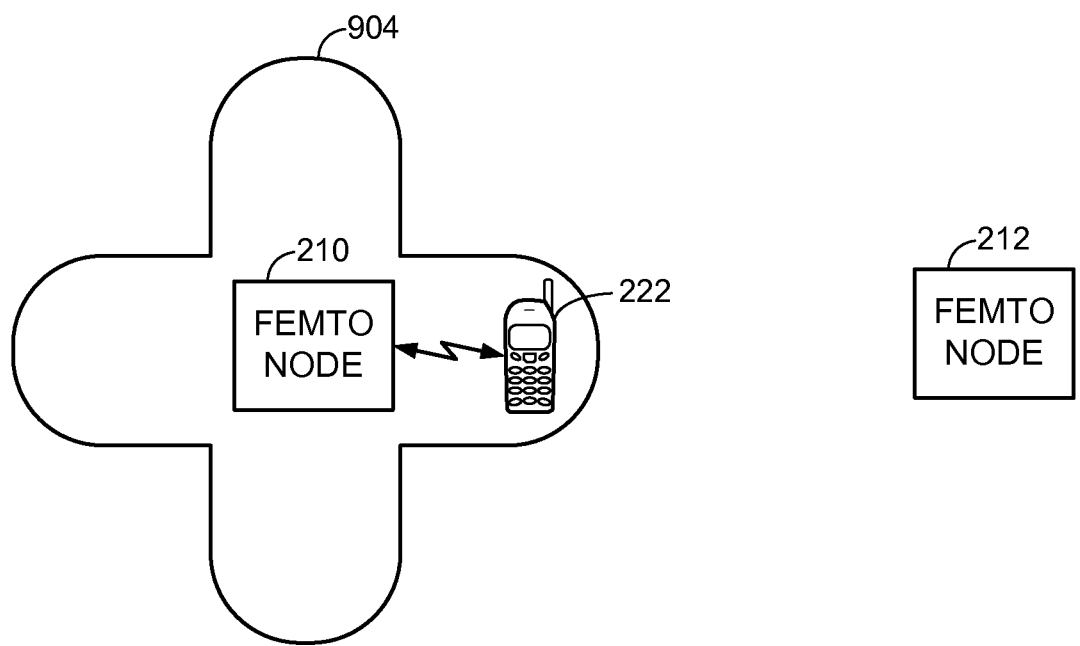
FIG. 10 illustrates a fourth group of exemplary coverage areas for two femto nodes in one of the communication networks of FIG. 2 at a second point in time.

FIG. 10 illustrates a fourth group of exemplary coverage areas for femto nodes in one of the communication networks of FIG. 2 at a second point in time. As discussed above in FIG. 9, the femto node 212 may receive a cooperation request from the AT 222, in between the first point in time and the second point in time. The cooperation request may indicate that the AT 222 is experience interference on the wireless link between the femto node 210 and the AT 222.

The femto node 212 may respond to the cooperation request by intermittently transmitting wireless signals. For example, the femto node 212 may transmit wireless signals for a first period of time, stop transmitting wireless signals for a second period time, and start transmitting wireless signals for a third period of time, and so on and so forth. As shown in FIG. 10, the femto node 212 may cease transmitting wireless signals for a period of time. During the periods of time where the femto node 212 does not transmit wireless signals, the coverage area 904 of the femto node 210 does not overlap with the coverage area of the femto node 212. Thus, the AT 222 is not within the coverage area of the femto node 212 during the periods of time where the femto node 212 does not transmit wireless signals. This may mitigate and/or reduce the interference on the wireless link between the AT 222 and the femto node 210.

In one embodiment, the periods of time that the femto node 212 may transmit a wireless signal and cease transmission of the wireless signal may be constant. For example, the femto node 212 may transmit a wireless signal for 10 milliseconds, and then cease transmission of the wireless signal for 10 milliseconds, and so on and so forth. In another example, the femto node 212 may transmit a wireless signal for 15 milliseconds, and then cease transmission of the wireless signal for 5 milliseconds, and so on and so forth. In another embodiment, the periods of time that the femto node 212 may transmit a wireless signal and cease transmission of the wireless signal may be variable. For example, the femto node 212 may transmit a wireless signal for 8 milliseconds, cease transmission of the wireless signal for 5 milliseconds, transmit the wireless signal for 10 milliseconds, cease the transmission of the wireless signal for 2 milliseconds, etc. The femto node 212 may transmit and cease transmission of the wireless signal for any variable and/or constant length of time.

Although not shown in the figures, in one embodiment, the femto node 212 may intermittently transmit the wireless signal at a lower power level, rather than intermittently ceasing transmission of the wireless signal. Transmitting the wireless signal at a lower power level may decrease the coverage are of the femto node 212. This decrease in coverage area may result in a mitigation and/or reduction of the interference on the wireless link between the AT 222 and the femto node 210. For example, referring to FIG. 7, when the femto node 212 transmits the wireless signal at a lower power level, the coverage area 708a may decrease such that the coverage area 708a and 704 no longer overlap. This may mitigate and/or decrease the amount of interference the AT 222 experiences.

In one embodiment, the cooperation request sent by the AT 222 may contain data indicative of the lengths of time the femto node 212 should transmit and cease transmission of the wireless signal. In another embodiment, the femto node 212 may obtain the lengths of time the femto node 212 should transmit and cease transmission of the wireless signal from the storing module 610 shown in FIG. 6.

In one embodiment, the AT 222 may periodically send cooperation requests to the femto node 212 in order inform the femto node 212 that the femto node 212 should continue the intermittent transmission of the wireless signal. For example, while the AT 222 is in a voice call with the femto node 210, it may periodically send cooperation requests to the femto node 212 in order to minimize interference on the wireless link during the voice call. After the AT 222 terminates the voice call with the femto node 210, the AT 222 may stop sending cooperation requests to the femto node 212, since the AT 222 has terminated the wireless link between the femto node 210 and the AT 222. The femto node 212 may cease intermittent transmission of the wireless signal and revert back to constant transmission of the wireless signal.

Figure 11:
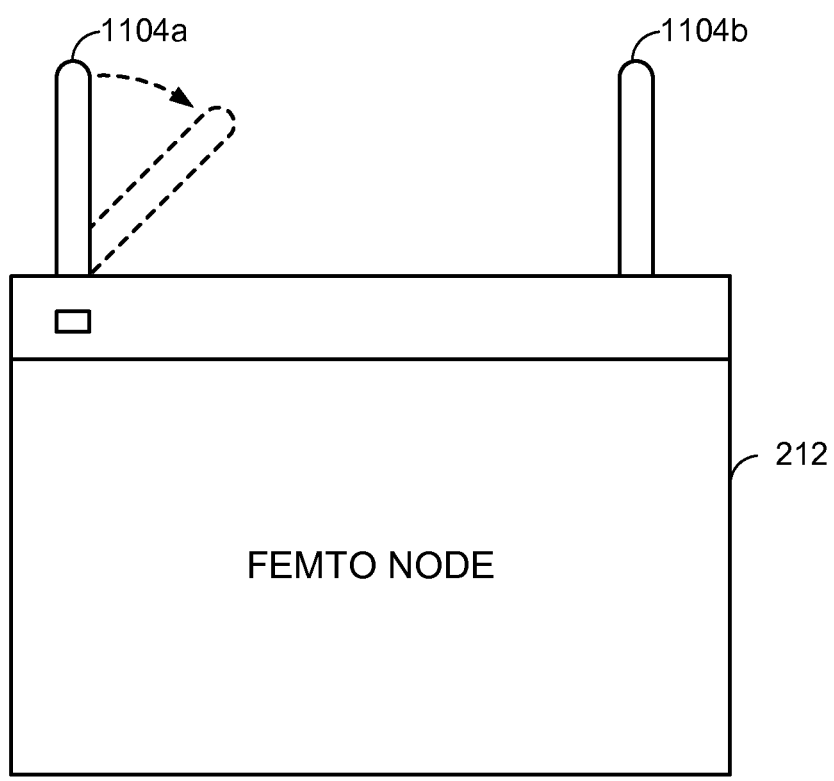
FIG. 11 illustrates a third exemplary femto node in one of the communication networks of FIG. 2.

FIG. 11 illustrates a third exemplary femto node 212 in one of the communication networks of FIG. 2. The femto node 212 comprises two antennas, antenna 1104*a* and 1104*b*. In other embodiments, the femto node 212 may comprise one or more antenna. For example, the femto node 212 may comprise one antenna only. In another example, the femto node 212 may comprise four antennas. The antennas 1104*a* and 1104*b* may be movable (e.g., the orientation of the antenna may be changed). The antennas 1104*a* and 1104*b* may be moved using at least one of a motor, a magnetic actuator (e.g., a device that moves an object using a magnetic force), a pneumatic actuator, or any means for physically moving the antenna. The movement of the antenna 1104*a* may change the coverage area for the femto node 212.

As discussed above in FIGS. 2 and 7 though 10, the femto node 212 may cause interference on the wireless link between the femto node 210 and the AT 222. The AT 222 may send a cooperation request to the femto node 212 using an access probe and/or using a separate message. In response to the cooperation request, the femto node 212 may move the antenna 1104*a* as shown in FIG. 11. The movement of the antenna 1104*a* to a different position may change the coverage area for the femto node 212. Moving and antenna may alter the coverage area of an antenna. For example, an antenna may be oriented toward a left side of a device. When the antenna is oriented to the left, the antenna may have a coverage area directed towards the left side of the device. When the antenna is oriented to the right side of the device, the antenna may have a coverage area directed towards the right side of the device. For example, prior to moving the antenna 1104*a*, the coverage area for the femto node 212 may be similar to the coverage area 708*a* shown in FIG. 7. After moving the antenna as shown in FIG. 11, the coverage area for the femto node 212 may be similar to the coverage area 708*b* shown in FIG. 8.

In one embodiment, the femto node 212 may comprise any number of antennas and any of the antennas may be movable. In another embodiment, the antennas may be movable in any direction and/or movable to any orientation. Moving and/or orientating any one of the antennas may change the coverage area of the femto node 212.

Figure 12:
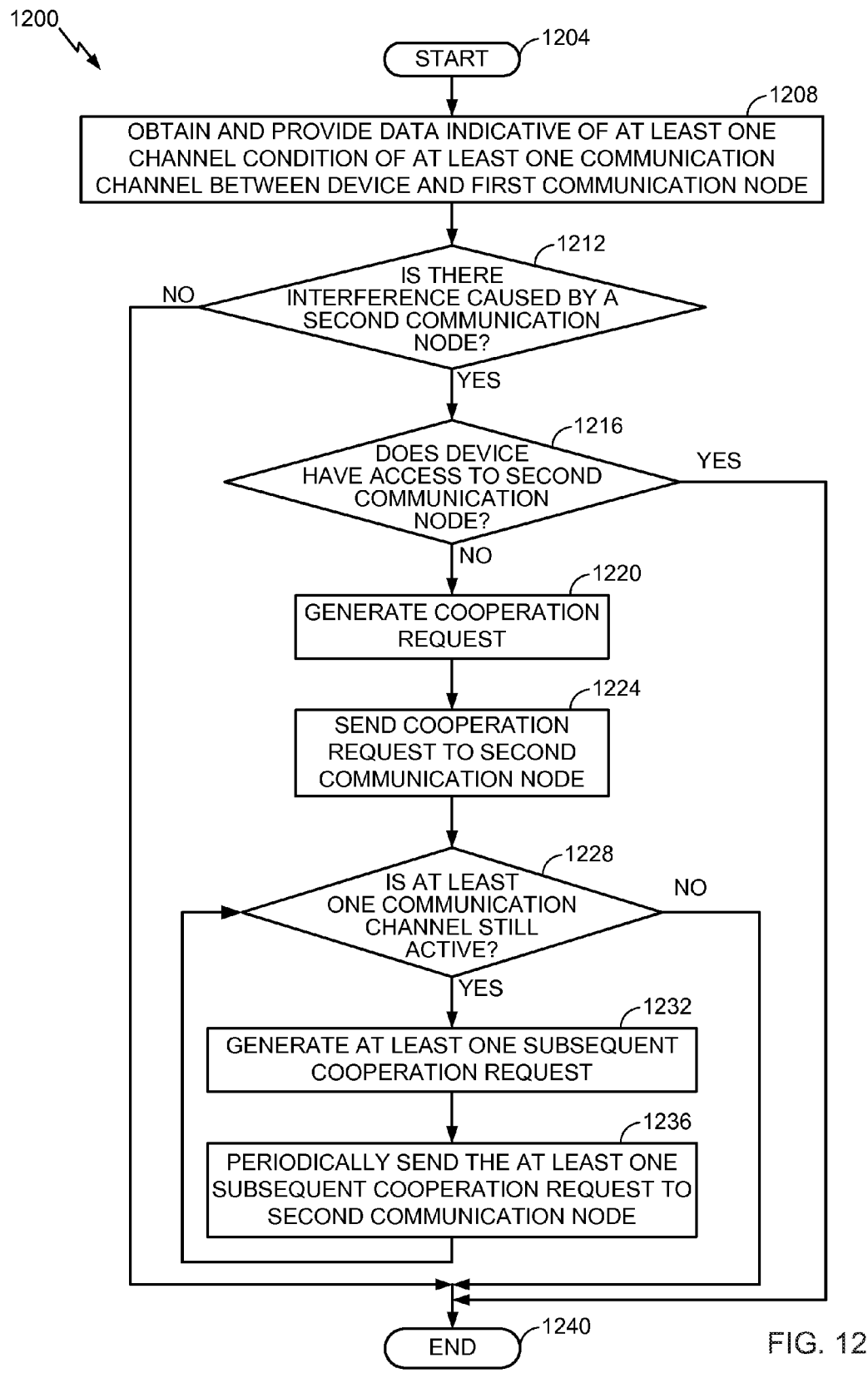
FIG. 12 is a flow chart illustrating a first exemplary communication process which may be performed by the access terminal shown in FIG. 5.

FIG. 12 is a flow chart illustrating a first exemplary communication process 1200 which may be performed by the access terminal 222 shown in FIG. 5. The process 1200 may be performed by the AT 222 when the AT 222 communicates with the femto node 210 via a wireless link as shown in FIGS. 2 and 5 through 10. The process 1200 begins at start bock 1204 and ends at end block 1240. Reference may be made to FIGS. 2, 5, and 6 in the description of FIG. 12. In one embodiment, parts of the process 1200 may be performed by at least one of the processing module 505 and the interference reduction module 515 of the AT 222 shown in FIG. 5. The process 1200 may be performed each time the AT 222 communicates with the femto node 210 via a wireless link.

The process 1200 starts at start block 1204 and moves to block 1208, where the AT 222 obtains and provides data indicative of at least one channel condition of at least one communication channel between the AT 222 and a first communication node (e.g., the femto node 210). For example, the AT 222 may measure the amount of noise on the communication channel (e.g., wireless link) between the AT 222 and the femto node 210. In another example, the AT 222 may measure the amount of signal power on the communication channel between the AT 222 and the femto node 210. In one embodiment, at least one of the receiving module 540 and the processing module 505 of the AT 222 may be used to obtain and provide data indicative of at least one channel condition. In another embodiment, a separate module such as the channel estimator module 525 may be used to obtain and provide data indicative of at least one channel condition. In one embodiment, the data indicative of at least one channel condition may be stored in the storing module 510 of the AT 222 for later access. After obtaining and provided data indicative of at least one channel condition, the process 1200 moves to block 1212, where the AT determines whether the interference on the communication channel between the AT 222 and the femto node 210 is caused by a second communication node (e.g., the femto node 212). If the interference is not caused by the femto node 212, the process 1200 moves to end block 1240, where the process 1200 ends. If the interference is caused by the femto node 212, the process 1200 moves to block 1216.

At block 1216 the AT 222 determines whether the AT 222 is allowed to access the femto node 212. If the AT 222 is allowed to access the femto node 212, the process 1200 moves to the end block 1240, where the process 1200 ends. If the AT 222 has access to the femto node 212 (e.g., the femto node is an open femto node and/or the AT 222 is a member of an access list of the femto node), the AT 222 may handover to the femto node 212 (e.g., establish a communication channel with the femto node 212), instead of generating a cooperation request as shown in block 1220. If the AT 222 is not allowed to access the femto node 212, the process 1200 moves to block 1220 where the AT 222 will generate a cooperation request. In one embodiment, the interference request module 515 may be used to generate the cooperation request. In another embodiment, the processing module 505 may be used to generate the cooperation request. In one embodiment, the cooperation request may be stored in the storing module 510 after it is generated. In a further embodiment, at least one of the interference request module 515, the processing module 505 and the storing module 510 may be used to generate the cooperation request. After generating the cooperation request, the process 1200 moves to block 1224 where the AT 222 sends the cooperation request to the femto node 212. In one embodiment, the AT 222 may access a cooperation request stored in the storing module 510 and send the cooperation request using the transmitting module 541. In another embodiment, the AT 222 may use at least one of the processing module 505, the transmitting module 541, and the storing module 510 to send the cooperation request to the femto node 212. After receiving the cooperation request, the femto node 212 may change its coverage area using any of the methods, techniques and mechanisms described above in FIGS. 7 through 11 and 13.

After sending the cooperation request, the process moves to block 1228, where the AT 222 determines whether there is at least one communication channel still active. For example, the AT 222 may determine if the AT 222 is still in a voice call.

In another example, the AT 222 may determine if the AT 222 is still in a data call and is sending data. If there is not at least one communication channel active, the process 1200 moves to end block 1240, where the process 1200 ends. If there is at least one communication still active, the process 1200 moves to block 1232, where the AT 222 generates at least one subsequent cooperation request. The at least one subsequent cooperation request may be generated as discussed above in conjunction with block 1220 of the process 1200. In one embodiment, the AT 222 may use a previously sent cooperation request, rather then generating a new cooperation request. After generating at least one subsequent cooperation request, the process moves to block 1236, where the AT 222 may periodically send the at least one subsequent cooperation request to the femto node 212. The at least one cooperation request may be sent as discussed above in conjunction with block 1224. The process 1200 then moves to block 1228 where the AT 222 determines whether there is at least one communication channel still active, as described above. If there is not at least one communication channel still active, the process 1200 moves to the end block 1240 where the process 1200 ends.

Figure 13:
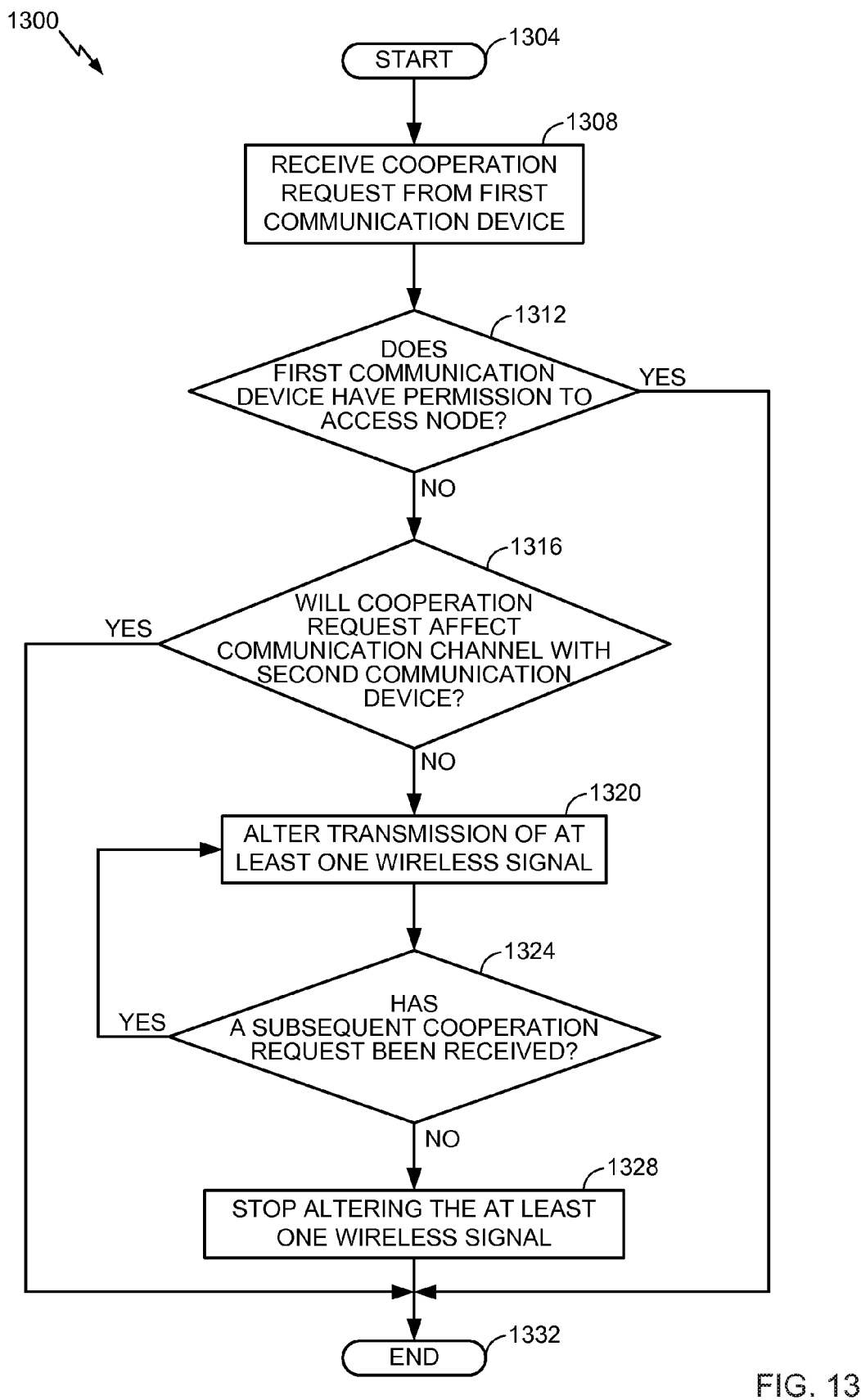
FIG. 13 is a flow chart illustrating a second exemplary communication process which may be performed by the femto node shown in FIG. 6.

FIG. 13 is a flow chart illustrating a second exemplary communication process 1300 which may be performed by the femto node 212 shown in FIG. 6. The process 1300 may be performed by the femto node 212 when the femto node 212 receives a cooperation request from the AT 222. The process 1300 begins at start bock 1304 and ends at end block 1332. Reference may be made to FIGS. 2, 5, and 6 in the description of FIG. 13. In one embodiment, parts of the process 1300 may be performed by at least one of the processing module 605 and the cooperation module 620 of the femto node 212 shown in FIG. 6. The process 1300 may be performed each time the femto node 212 receives a cooperation request from the AT 222.

The process 1300 starts at start block 1304 and moves to block 1308, where the femto node 212 receives a cooperation request from a first communication device (e.g., the AT 222). In one embodiment, the receiving module 630 of the femto node 212 may be used to receive the cooperation request. In another embodiment, at least one of the processing module 605 and the cooperation module 620 may be used to process the cooperation request. In a further embodiment, the storing module 610 may be used to store the received cooperation request. After receiving the cooperation request, the femto node 210 may determine whether the AT 222 has access to the femto node 212. If the AT 222 has access to the femto node 212, the process 1300 moves to end block 1332, where the process 1300 ends. If the AT 222 has access to the femto node 212 (e.g., the femto node 212 is an open femto node and/or the AT 222 is a member of an access list of the femto node 212), the femto node 212 may allow the AT 222 to handover to the femto node 212, rather than altering transmission of at least one wireless signal as shown in block 1320. If the AT 222 does not have access to the femto node 212, the process 1300 moves to block 1316.

At block 1316, the femto node 212 determines whether the cooperation request will affect the communication channel (e.g., the wireless link) between the femto node 212 and the AT 221, shown in FIG. 2. As discussed above in FIG. 2, the AT 222 is in communication with the femto node 210 and the AT 221 is in communication with the femto node 212. The coverage area 217 of the femto node 212 may affect the wireless link between the AT 222 and the femto node 210. The AT 222 may send a cooperation request to the femto node 212 according to process 1200 shown in FIG. 12. The femto node 212 may modify and/or alter its coverage area, as shown in FIGS. 7 through 11. However, the modification of the coverage area may affect the wireless link between the femto node 212 and the AT 221. If the femto node 212 determines that modifying its coverage area in response to the cooperation request received from the AT 222 will affect the wireless link between the AT 221 and the femto node 212, the femto node 212 may ignore and/or discard the cooperation request and the process 1300 moves to end block 1332. If the femto node 212 determines that modifying and/or altering its coverage area will not affect the wireless link between the femto node 212 and the AT 221, the process moves to block 1320.

In one embodiment, the femto node 212 may determine a threshold level of effect that modifying and/or altering its coverage area may have on the wireless link between the femto node 212 and the AT 221. If the effect is below the threshold level, the process 1300 may move to block 1320. If the effect is above a threshold level, the process 1300 may move to end block 1332. For example, the femto node 212 may determine that modifying and/or altering its coverage area may increase the noise on the wireless link between the femto node 212 and the AT 221 by a certain level. If this level is below a certain threshold, the femto node 212 may modify and/or alter its coverage area. If this level is above a certain threshold, the femto node 212 may not modify and/or alter its coverage area. In another example, the femto node 212 may determine that modifying and/or altering its coverage area may decrease the data rate on the wireless link between the femto node 212 and the AT 221 by a certain level. If this level is below a certain threshold, the femto node 212 may modify and/or alter its coverage area. If this level is above a certain threshold, the femto node 212 may not modify and/or alter its coverage area.

At block 1320, the femto node 212 may modify and/or alter its coverage area by altering the transmission of at least one wireless signal. The femto node 212 may modify and/or alter its coverage area using techniques, methods and mechanisms as described in FIGS. 7 though 11. In one embodiment, the transmitting module 631 may be used to alter the transmission of at least one wireless signal. In another embodiment, at least one of the processing module 605 and the cooperation module 620 may be used to alter the transmission of the at least one wireless signal. After altering the transmission of the at least one wireless signal, the process 1300 moves to block 1324, where the femto node 212 determines whether a subsequent cooperation request has been received. If a subsequent cooperation request has been received, the process 1300 moves to back to block 1320. Although not shown in FIG. 13, the process 1300 may alternatively move to block 1316, where the femto node 212 may determine if the cooperation request will affect the communication channel between the AT 221 and the femto node 212. If no subsequent cooperation request has been received, the process 1300 moves to block 1328, where the femto node 212 stops altering transmission of the at least one wireless signal. The process 1300 then moves to end block 1332, where the process 1300 ends.

Although the above-embodiments discuss femto nodes, other embodiments of the invention may be applicable to any type of node (e.g., macro nodes, Node Bs, etc.).

Figure 14:
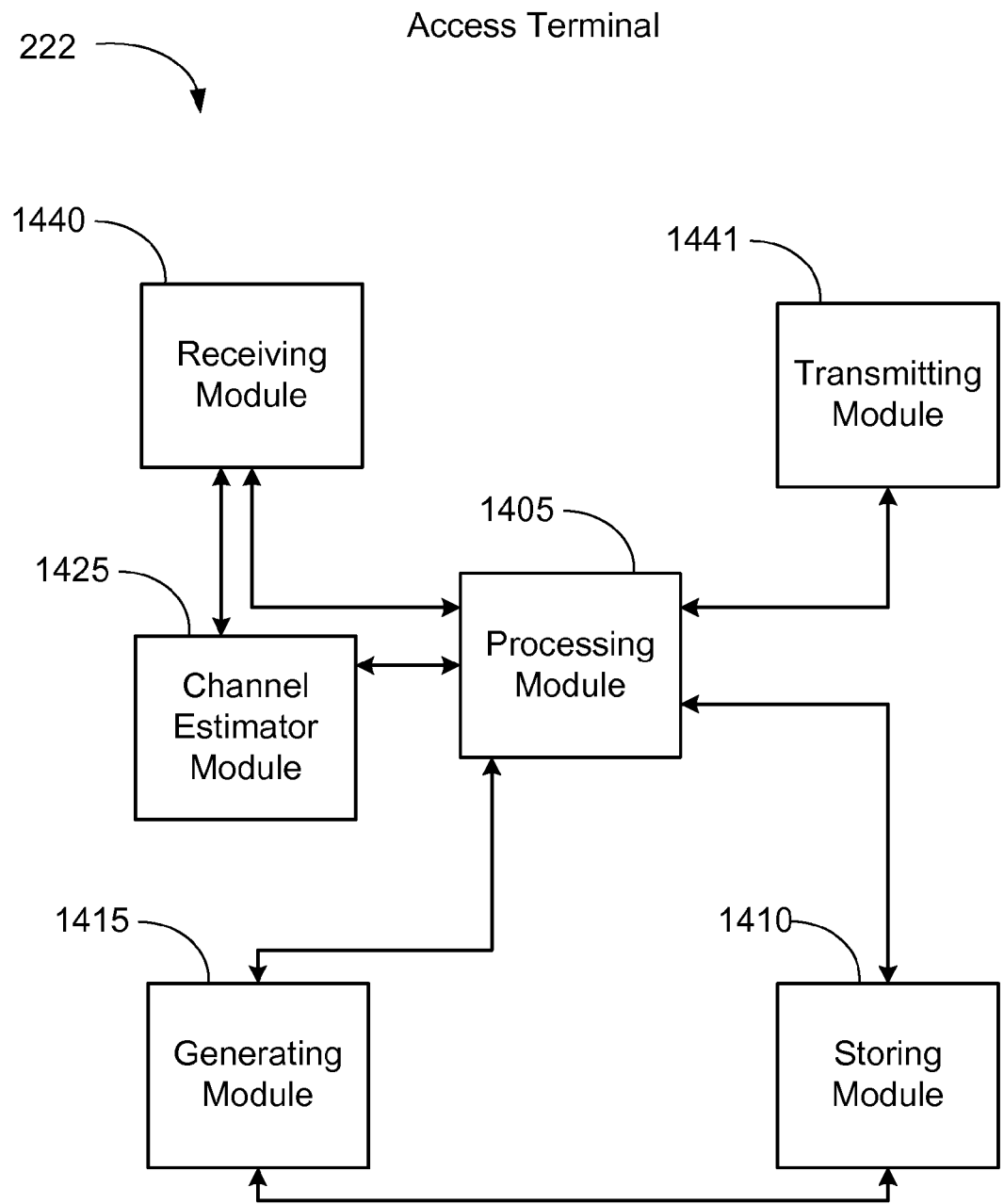
FIG. 14 is a functional block diagram of a third exemplary access terminal in one of the communication networks of FIG. 2.

FIG. 14 is a functional block diagram of a third exemplary access terminal 222 in one of the communication networks of FIG. 2. As shown, the access terminal 222 may comprise a processing module 1405, a storing module 1410, a generating module 1415, a channel estimator module 1425, a receiving module 1440, and a transmitting module 1440. The processing module 1405 is coupled to the storing module 1210, the generating module 1415, the channel estimator module 1425, the receiving module 1440, and the transmitting module 1441. The generating module 1415 is coupled to the storing module 1410. The channel estimator module 1425 is coupled to the transmitting module 1440. The processing module 1405 may correspond at least in some aspects to, for example, a processor as discussed herein. The storing module 1410 may correspond at least in some aspects to, for example, a memory as discussed herein. The receiving module 1440 may correspond at least in some aspects to, for example, a transceiver and/or an antenna as discussed herein. The transmitting module 1441 may correspond at least in some aspects to, for example, a transceiver and/or an antenna as discussed herein. The generating module 1415 may correspond at least in some aspects to, for example, the interference reduction module 515 shown in FIG. 5, as discussed herein.

Figure 15:
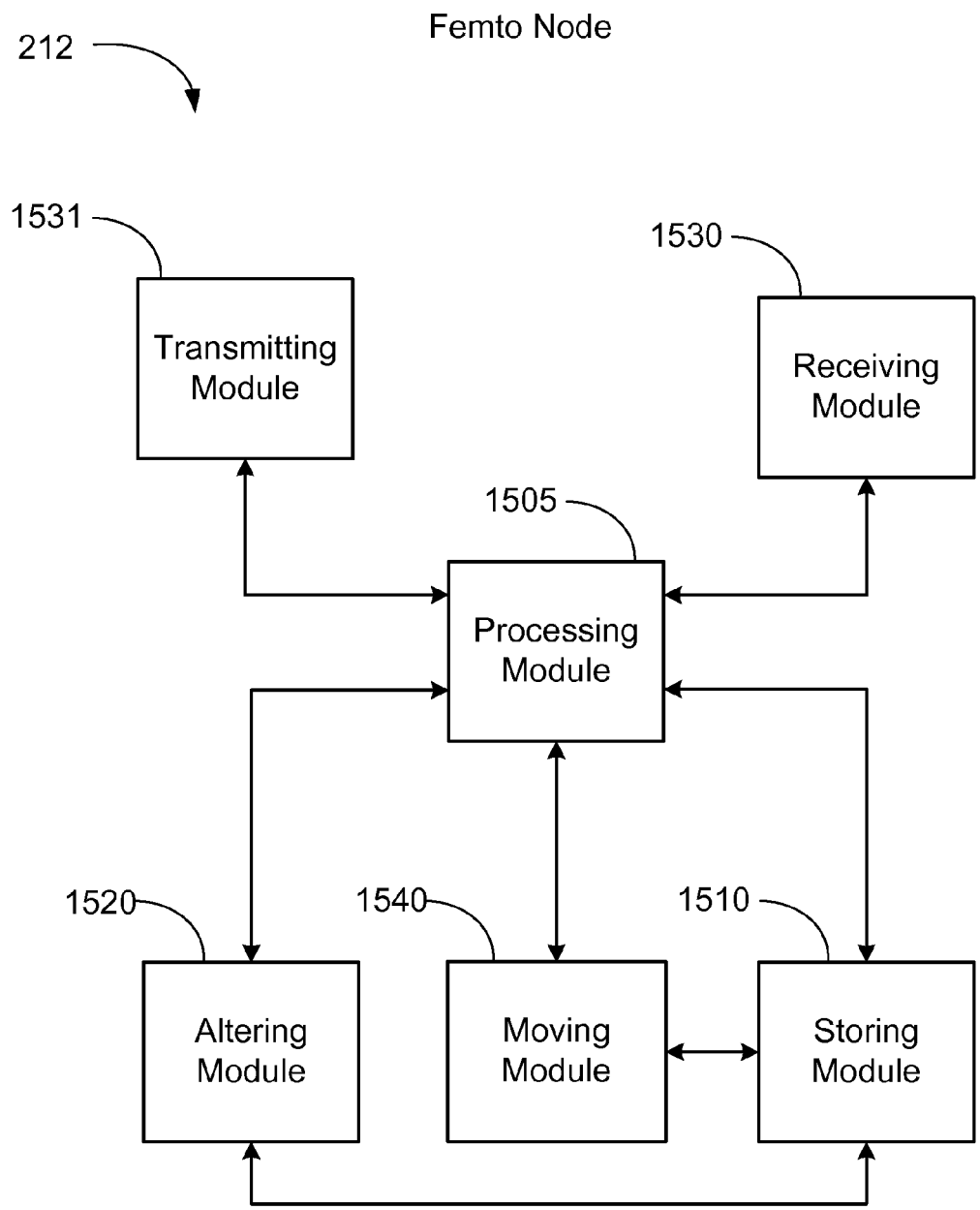
FIG. 15 is a functional block diagram of a third exemplary femto node in one of the communication networks of FIG. 2.

FIG. 15 is a functional block diagram of a third exemplary femto node 212 in one of the communication networks of FIG. 2. As shown, the femto node 212 may comprise a processing module 1505, a storing module 1510, an altering module 1520, a moving module 1540, a receiving module 1530, and a transmitting module 1531. The processing module 1505 is coupled to the storing module 1510, the altering module 1520, the moving module 1540, the receiving module 1530, and the transmitting module 1531. The altering module 1520 is coupled to the storing module 1510. The moving module 1450 is coupled to the storing module 1510. The processing module 1505 may correspond at least in some aspects to, for example, a processor as discussed herein. The storing module 1510 may correspond at least in some aspects to, for example, a memory as discussed herein. The receiving module 1530 may correspond at least in some aspects to, for example, a transceiver and/or an antenna as discussed herein. The transmitting module 1531 may correspond at least in some aspects to, for example, a transceiver and/or an antenna as discussed herein. The altering module 1520 may correspond at least in some aspects to, for example, the cooperation module 620 shown in FIG. 6, as discussed herein. The moving module 1540 may correspond at least in some aspects to, for example, the cooperation module 620 shown in FIG. 6, as discussed herein.

The functionality of the modules of FIGS. 5, 6, 14, and 15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. The functionality described herein (e.g., with regard to one or more of the accompanying figures) may correspond in some aspects to similarly designated "means for" functionality in the appended claims. Referring to FIGS. 5, 6, 14, and 15, the femto node 210 and the AT 222 are represented as a series of interrelated functional modules.

The functionality of the modules of FIGS. 5, 6, 14, and 15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, a connection may be used to transmit and/or receive computer-readable medium. For example, the software may be transmitted from a website, server, or other remote source using a coaxial cable, fiber optic cable, twisted pair, digital subscriber line (DSL), or wireless technologies such as infrared, radio, and microwave. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless communication apparatus operable in a communication system, the wireless communication apparatus comprising:
    a receiver configured to measure at least one channel condition of at least one communication channel of a first communication node and determine spatial direction information of an interfering signal from the at least one channel condition;
    a first circuit configured to generate a request based on, at least in part, data indicative of the at least one channel condition and the spatial direction information, wherein the request informs a second communication node about a presence of interference from the interfering signal on the at least one communication channel caused by the second communication node, and wherein the request is configured to cause the second communication node to modify a physical characteristic of at least one transmitted wireless signal to reduce the interference by changing a geographical coverage area covered by the at least one transmitted wireless signal of the second communication node based on the spatial direction information of the interfering signal; and
    a transmitter configured to transmit the request to the second communication node.

2. The apparatus of claim 1, wherein the request is further configured to cause the second communication node alter transmission of the at least one transmitted wireless signal by periodically ceasing transmission of the at least one transmitted wireless signal.

3. The apparatus of claim 1, wherein the first circuit is further configured to generate at least one subsequent request, wherein the at least one subsequent request informs the second communication node about the presence of interference on the at least one communication channel caused by the second communication node, and wherein the transmitter is further configured to periodically transmit the at least one subsequent request to the second communication node.

4. The apparatus of claim 1, wherein the transmitter is further configured to transmit a registration message comprising the request to the second communication node.

5. The apparatus of claim 1, wherein the transmitter is further configured to transmit the request in a separate message to the second communication node.

6. The apparatus of claim 1, wherein the request comprises at least one of an identifier, a location, a data rate, a measured channel quality, a reference signal power, a pilot channel power, an interference level, a noise level, a signal power level, and a signal to noise ratio.

7. The apparatus of claim 1, wherein the directional transmission comprises modifying a phase of a first signal transmitted from a first antenna, a phase of a second signal transmitted from a second antenna, and an amplitude of a third signal transmitted from a third antenna.

8. The apparatus of claim 1, wherein the spatial direction information is determined via a spherical or circular coordinate system configured to identify from what direction on the second communication node the interfering signal originates.

9. A wireless communication apparatus operable in a communication system, the wireless communication apparatus comprising:
    means for a measuring at least one channel condition of at least one communication channel of a first communication node;
    means for determining spatial direction information of an interfering signal from the at least one channel condition;
    means for generating a request based on, at least in part, data indicative of the at least one channel condition and the spatial direction information, wherein the request informs a second communication node about a presence of interference from the interfering signal on the at least one communication channel of the first communication node caused by the second communication node, and wherein the request is configured to cause the second communication node to modify a physical characteristic of at least one transmitted wireless signal to reduce the interference by changing a geographical coverage area covered by the at least one transmitted wireless signal of the second communication node based on the spatial direction information of the interfering signal; and
    means for transmitting the request to the second communication node.

10. The apparatus of claim 9, wherein the means for generating is further configured to generate at least one subsequent request, wherein the at least one subsequent request informs the second communication node about the presence of interference on the at least one communication channel caused by the second communication node, and wherein the means for transmitting is further configured to periodically transmit the at least one subsequent request to the second communication node.

11. The apparatus of claim 9, wherein the request comprises at least one of an identifier, a location, a measured channel quality, a reference signal power, a pilot channel power, an interference level, a noise level, a signal power level, and a signal to noise ratio.

12. A method of communicating in a communication system, the method comprising:
measuring at least one channel condition of at least one communication channel of a first communication node;
determining spatial direction information of an interfering signal from the at least one channel condition;
generating a request based on, at least in part, data indicative of the at least one channel condition and the spatial direction information, wherein the request informs a second communication node about a presence of interference from the interfering signal on the at least one communication channel of the first communication node caused by the second communication node, and wherein the request is configured to cause the second communication node to modify a physical characteristic of at least one transmitted wireless signal to reduce the interference by changing a geographical coverage area covered by the at least one transmitted wireless signal of the second communication node based on the spatial direction information of the interfering signal; and
transmitting the request to the second communication node.

13. The method of claim 12, wherein the request is further configured to cause the second communication node alter transmission of at least one transmitted wireless signal by periodically ceasing transmission of the at least one transmitted wireless signal.

14. The method of claim 12, further comprising generating at least one subsequent request and periodically transmitting the at least one subsequent request to the second communication node, wherein the at least one subsequent request informs the second communication node about the presence of interference on the at least one communication channel caused by the second communication node.

15. The method of claim 12, wherein transmitting the request comprises transmitting a registration message comprising the request to the second communication node.

16. The method of claim 12, wherein transmitting the request comprises transmitting the request in a separate message to the second communication node.

17. The method of claim 12, wherein the request comprises at least one of an identifier, a location, a measured channel quality, a reference signal power, a pilot channel power, an interference level, a noise level, a signal power level, and a signal to noise ratio.

18. A computer program product, comprising:
a non-transitory computer-readable medium comprising:
code for causing a computer to measure at least one channel condition of at least one communication channel of a first communication node;
code for causing the computer to determine spatial direction information of an interfering signal from the at least one channel condition;
code for causing the computer to generate a request based on, at least in part, data indicative of the at least one channel condition and the spatial direction information, wherein the request informs a second communication node about a presence of interference from the interfering signal on the at least one communication channel of the first communication node caused by the second communication node, and wherein the request is configured to cause the second communication node to a physical characteristic of at least one transmitted wireless signal to reduce the interference by changing a geographical coverage area covered by the at least one transmitted wireless signal of the second communication node based on the spatial direction information of the interfering signal; and
code for causing the computer to transmit the request to the second communication node.

19. The computer program product of claim 18, further comprising code for causing the computer to generate at least one subsequent request and further comprising code for causing the computer to periodically transmit the at least one subsequent request to the second communication node, wherein the at least one subsequent request informs the second communication node about the presence of interference on the at least one communication channel caused by the second communication node.

20. The computer program product of claim 18, wherein the request comprises at least one of an identifier, a location, a data rate, a measured channel quality, a reference signal power, a pilot channel power, an interference level, a noise level, a signal power level, and a signal to noise ratio.

21. A wireless communication apparatus operable in a communication system, the wireless communication apparatus comprising:
a transmitter configured to transmit at least one wireless signal;
a receiver configured to receive a request from a first communication device, wherein the request indicates a presence of interference on at least one communication channel of a first communication node caused by the at least one wireless signal, and wherein the request includes spatial direction information of the at least one wireless signal; and
a first circuit configured to alter transmission comprising modifying a physical characteristic of the at least one transmitted wireless signal to reduce the interference based on the request by changing a geographical coverage area covered by the at least one transmitted wireless signal based on the spatial direction information of the at least one transmitted wireless signal.

22. The apparatus of claim 21, wherein the receiver is further configured to receive at least one subsequent request from the first communication device, wherein the at least one subsequent request indicates the presence of interference on at the least one communication channel of the first communication node caused by the at least one transmitted wireless signal, and wherein the first circuit is further configured to further alter transmission of the at least one transmitted wireless signal based on, at least in part, the at least one subsequent request.

23. The apparatus of claim 21, wherein the receiver is further configured to receive an access probe comprising the request, from the first communication device.

24. The apparatus of claim 21, wherein the receiver is further configured to receive the request in a separate message from the first communication device.

25. The apparatus of claim 21, wherein the first circuit is further configured to ignore the request from the first communication device based on, at least in part, data indicative of at least one channel condition of at least one communication channel of a second communication device.

26. The apparatus of claim 21, wherein the request comprises at least one of an identifier, a location, a data rate, a measured channel quality, a reference signal power, a pilot channel power, an interference level, a noise level, a signal power level, and a signal to noise ratio.

27. The apparatus of claim 21, further comprising a second circuit configured to change a physical orientation of an antenna that generates the at least one transmitted wireless signal, based on, at least in part, the request.

28. The apparatus of claim 21, wherein the directional transmission comprises modifying a phase of a first signal transmitted from a first antenna, a phase of a second signal transmitted from a second antenna, and an amplitude of a third signal transmitted from a third antenna.

29. The apparatus of claim 21, wherein the spatial direction information is determined via a spherical or circular coordinate system configured to identify from what direction on the transmitter the at least one transmitted wireless signal originates.

30. A wireless communication apparatus operable in a communication system, the wireless communication apparatus comprising:
means for transmitting at least one wireless signal;
means for receiving a request from a first communication device, wherein the request indicates a presence of interference on at least one communication channel of a first communication node caused by the at least one wireless signal, and wherein the request includes spatial direction information of the at least one wireless signal; and
means for altering transmission comprising modifying a physical characteristic of the at least one transmitted wireless signal to reduce the interference based on the request by changing a geographical coverage area covered by the at least one transmitted wireless signal based on the spatial direction information of the at least one transmitted wireless signal.

31. The apparatus of claim 30, wherein the means for receiving is further configured to receive at least one subsequent request from the first communication device, wherein the at least one subsequent request indicates the presence of interference on at the least one communication channel of the first communication node caused by the at least one transmitted wireless signal, and wherein the means for altering is further configured to further alter transmission of the at least one transmitted wireless signal based on, at least in part, the at least one subsequent request.

32. The apparatus of claim 30, further comprising means for moving configured to change a physical orientation of an antenna that generate the at least one transmitted wireless signal, based on, at least in part, the request.

33. The apparatus of claim 30, wherein the means for altering is further configured to ignore the request from the first communication device based on, at least in part, data indicative of at least one channel condition of at least one communication channel of a second communication device.

34. The apparatus of claim 30, wherein the request comprises at least one of an identifier, a location, a data rate, a measured channel quality, a reference signal power, a pilot channel power, an interference level, a noise level, a signal power level, and a signal to noise ratio.

35. A method of communicating in a communication system, the method comprising:
transmitting at least one wireless signal;
receiving a request from a first communication device, wherein the request indicates a presence of interference on at least one communication channel of a first communication node caused by the at least one wireless signal, and wherein the request includes spatial direction information of the at least one wireless signal; and
altering transmission comprising modifying a physical characteristic of the at least one transmitted wireless signal to reduce the interference based on the request by changing a geographical coverage area covered by the at least one transmitted wireless signal based on the spatial direction information of the at least one transmitted wireless signal.

36. The method of claim 35, further comprising receiving at least one subsequent request from the first communication device, wherein the at least one subsequent request indicates the presence of interference on at the least one communication channel of the first communication node caused by the at least one transmitted wireless signal, and further comprising further altering transmission of the at least one transmitted wireless signal based on, at least in part, the at least one subsequent request.

37. The method of claim 35, further comprising receiving an access probe comprising the request, from the first communication device.

38. The method of claim 35, further comprising receiving the request in a separate message from the first communication device.

39. The method of claim 35, further comprising ignoring the request from the first communication device based on, at least in part, data indicative of at least one channel condition of at least one communication channel of a second communication device.

40. The method of claim 35, wherein the request comprises at least one of an identifier, a location, a data rate, a measured channel quality, a reference signal power, a pilot channel power, an interference level, a noise level, a signal power level, and a signal to noise ratio.

41. A computer program product, comprising:
a non-transitory computer-readable medium comprising:
code for causing a computer to transmit at least one wireless signal;
code for causing the computer to receive a request from a first communication device, wherein the request indicates a presence of interference on at least one communication channel of a first communication node caused by the at least one wireless signal, and wherein the request includes spatial direction information of the at least one wireless signal; and
code for causing the computer to alter transmission comprising modifying a physical characteristic of the at least one transmitted wireless signal to reduce the interference based on the request by changing a geographical coverage area covered by the at least one transmitted wireless signal based on the spatial direction information of the at least one transmitted wireless signal.

42. The computer program product of claim 41, further comprising code for causing the computer to receive at least one subsequent request from the first communication device, wherein the at least one subsequent request indicates the presence of interference on at the least one communication channel of the first communication node caused by the at least one transmitted wireless signal, and further comprising code for causing the computer to further alter transmission of the at least one transmitted wireless signal based on, at least in part, the at least one subsequent request.

43. The computer program product of claim 41, further comprising code for causing the computer to ignore the request from the first communication device based on, at least in part, data indicative of at least one channel condition of at least one communication channel of a second communication device.

44. The computer program product of claim 41, wherein the request comprises at least one of an identifier, a location, a data rate, a measured channel quality, a reference signal power, a pilot channel power, an interference level, a noise level, a signal power level, and a signal to noise ratio.

* * * * *